US012770534B2

(12) United States Patent
Kelly et al.

(10) Patent No.: US 12,770,534 B2
(45) Date of Patent: Oct. 20, 2026

(54) ARTICULATING PEDESTRIAN DUMMY FOR VEHICLE TESTING

(71) Applicant: Dynamic Research, Inc., Torrance, CA (US)

(72) Inventors: Joseph Kelly, Lakewood, CA (US); Jordan Y Silberling, Redondo Beach, CA (US); Nenad Bozin, San Pedro, CA (US)

(73) Assignee: Dynamic Research, Inc., Torrance, CA (US)

( * ) Notice: Subject to any disclaimer, the term of this patent is extended or adjusted under 35 U.S.C. 154(b) by 277 days.

(21) Appl. No.: 18/614,961

(22) Filed: Mar. 25, 2024

(65) Prior Publication Data

US 2024/0242631 A1 Jul. 18, 2024

Related U.S. Application Data

(63) Continuation of application No. 18/695,052, filed as application No. PCT/US2022/045956 on Oct. 6, 2022, now Pat. No. 12,609,050.

(Continued)

(51) Int. Cl.

*G09B 23/32* (2006.01)
*B62D 57/032* (2006.01)
*G09B 23/34* (2006.01)

(52) U.S. Cl.

CPC ........... *G09B 23/32* (2013.01); *B62D 57/032* (2013.01); *G09B 23/34* (2013.01)

(58) Field of Classification Search

CPC ....... G09B 23/32; G09B 23/34; B62D 57/032
See application file for complete search history.

(56) References Cited

U.S. PATENT DOCUMENTS 5,644,204 A * 7/1997 Nagle .................. B62D 57/032 318/568.25
6,198,247 B1 * 3/2001 Barr ........................ G09F 19/08 403/53

(Continued)

FOREIGN PATENT DOCUMENTS

CN 106814610 A * 6/2017 ........... G05B 13/042
KR 20110074520 A * 6/2011 ............... A61F 2/70
WO WO-2006064598 A1 * 6/2006 ................ B25J 5/00

OTHER PUBLICATIONS

Abbass et al. “Kinematic analysis of human gait cycle” Nahrain University, College of Engineering Journal (NUCEJ) vol. 16 No. 2, 2014 pp. 208-222 (Year: 2014).*

(Continued)

*Primary Examiner* — Xuan M Thai
*Assistant Examiner* — Andrew Bodendorf
(74) *Attorney, Agent, or Firm* — Manuel de la Cerra

(57) ABSTRACT

A method for creating a realistic human gait for a dummy with a leg comprising an articulating hip joint and knee joint, wherein the gait comprises a gait cycle is disclosed. The method includes (a) defining the duration of the stance phase and swing phase; (b) determining the position of the dummy within the gait cycle; (c) calculating a knee angle based on: (1) the position of step (b), and (2) whether the position is in the stance phase or the swing phase; and (d) calculating a hip angle based on: (1) the knee angle of step (c), (2) the position of step (b), and (3) whether the position is in the stance phase or the swing phase.

18 Claims, 22 Drawing Sheets

Related U.S. Application Data

(60) Provisional application No. 63/349,675, filed on Jun. 7, 2022, provisional application No. 63/285,660, filed on Dec. 3, 2021, provisional application No. 63/253,292, filed on Oct. 7, 2021.

(56) References Cited

U.S. PATENT DOCUMENTS

| | | | | |
|---|---|---|---|---|
| 6,755,870 | B1 * | 6/2004 | Biedermann | A61F 2/70 623/24 |
| 7,295,892 | B2 * | 11/2007 | Herr | B62D 57/032 700/258 |
| 9,314,393 | B2 * | 4/2016 | Kim | A61N 1/36031 |
| 9,355,576 | B2 * | 5/2016 | Fritz | G09B 23/32 |
| 9,387,896 | B1 * | 7/2016 | Blankespoor | B62D 57/032 |
| 9,827,998 | B1 * | 11/2017 | Kelly | G01M 17/0078 |
| 10,531,968 | B2 * | 1/2020 | Coggins | G01M 99/008 |
| 10,772,743 | B2 * | 9/2020 | Seifert | A61F 2/68 |
| 2007/0162152 | A1 * | 7/2007 | Herr | B25J 19/0008 623/24 |
| 2009/0265018 | A1 * | 10/2009 | Goldfarb | A61F 2/60 623/40 |
| 2010/0113980 | A1 * | 5/2010 | Herr | G01L 5/0028 600/587 |
| 2010/0324699 | A1 * | 12/2010 | Herr | A61F 2/66 623/27 |
| 2013/0226048 | A1 * | 8/2013 | Unluhisarcikli | A61H 1/0244 601/34 |
| 2014/0102224 | A1 * | 4/2014 | Fritz | G09B 23/32 73/866.4 |
| 2015/0066156 | A1 * | 3/2015 | Geyer | A61F 2/605 623/32 |
| 2015/0120044 | A1 * | 4/2015 | Cory | B62D 57/032 700/250 |
| 2015/0317917 | A1 * | 11/2015 | Fritz | G01M 17/007 434/267 |
| 2020/0107951 | A1 * | 4/2020 | Han | A61F 5/0125 |

OTHER PUBLICATIONS

Barkia et al. "Extraction of Human Gait Signatures: An Inverse Kinematic Approach Using Groebner Basis Theory Applied to Gait Cycle Analysis" Proc of SPIE vol. 8734, 87340L • © 2013 SPIE • CCC code: 0277-786X/13/$18 • doi: 10.1117/12.2018336 (Year: 2013).*

Werfalli et al. "Normal Human Gait Analysis of Right Lower Limb During Complete Cycle Using Sub-Parametric Fitting Functions" 2021 IEEE 1st International Maghreb Meeting of the Conference on Sciences and Techniques of Automatic Control and Computer Engineering MI-STA, May 25-27, 2021, Tripoli-Libya (Year: 2021).*

Astero "Active Safety Test Robot" from www.messring.de via wayback machine Aug. 25, 2019 (Year: 2019).*

Kopelovich "Gait Range of Motion Animation" https://www.youtube.com/watch?v=5Z6shSu96CM Sep. 4, 2020 (Year: 2020).*

Biorealistic Articulated Target for AEB VRU tests: Astero Messring GmbH https://www.youtube.com/watch?v=EmBzJb208CU Sep. 17, 2020 (Year: 2020).*

* cited by examiner (Section 6C-6C from FIG. 6A)

SECTION A-A (SAE International, 2017)
(PRIOR ART)

(SAE International, 2017)
(PRIOR ART)

(SAE International, 2017)
(PRIOR ART)

ARTICULATING PEDESTRIAN DUMMY FOR VEHICLE TESTING

RELATED APPLICATIONS

The present invention is a continuation application of U.S. application Ser. No. 18/695,052 entitled "Articulating Pedestrian Dummy for Vehicle Testing" filed on Mar. 25, 2024, which is the Section 371 national filing of PCT application PCT/US22/45956 entitled "Articulating Pedestrian Dummy for Vehicle Testing" filed on Oct. 6, 2022, which in turn claims priority to U.S. Provisional Patent Application No. 63/253,292 entitled "Articulating Pedestrian Dummy for ADAS and AV Evaluation", filed Oct. 7, 2021; to U.S. Provisional Patent Application No. 63/285,660 entitled "Articulating Pedestrian Dummy for ADAS and AV Evaluation" filed on Dec. 3, 2021; and to U.S. Provisional Patent Application No. 63/349,675 entitled "Articulating Pedestrian Dummy for ADAS and AV Evaluation" filed on Jun. 7, 2022, each of these applications is hereby incorporated in its entirety including all tables, figures and claims.

TECHNICAL FIELD

The present invention relates to devices, systems, and methods for testing crash avoidance technologies.

BACKGROUND OF THE INVENTION

The system disclosed herein can be used with, but is not limited to, vehicles employed in crash avoidance technologies disclosed in the following patent applications developed by the same inventors and assigned to the same assignee: U.S. patent application Ser. No. 14/050,039 entitled "System and Method for testing Crash Avoidance Technologies" filed on Oct. 9, 2013 by Joseph Kelly et al; U.S. patent application Ser. No. 14/050,048 entitled "System and Method for testing Crash Avoidance Technologies" filed on Oct. 9, 2013 by Joseph Kelly et al; U.S. Patent Application No. 61/874,274 entitled "Master-Slave Automated Coordinated Vehicle Control" filed Sep. 5, 2013 by Joseph Kelly et al; U.S. Patent Application No. 61/874,267 entitled "Rigid Belt Drive Tensioner" filed Sep. 5, 2013 by Joseph Kelly et al; U.S. Patent Application No. 61/874,264 entitled "Robotic Hydraulic Brake Master Cylinder" filed Sep. 5, 2013 by Joseph Kelly et al; U.S. patent application Ser. No. 13/357,526 entitled "System and Method for Testing Crash Avoidance Technologies" filed Jan. 24, 2012 by Joseph Kelly et al (issued as U.S. Pat. No. 8,447,509); U.S. Patent Application No. 61/507,539 entitled "Guided Soft Target For Full Scale Advanced Crash Avoidance Technology Testing" filed on Jul. 13, 2011 by Joseph Kelly et al; U.S. Patent Application No. 61/578,452 entitled "Guided Soft Target For Full Scale Advanced Crash Avoidance Technology Testing" filed on Dec. 21, 2011 filed by Joseph Kelly et al; U.S. Patent Application No. 61/621,597 entitled "Collision Partner, System and Method" filed on Apr. 9, 2012 by Joseph Kelly et al; U.S. Patent Application No. 61/639,745 entitled "Devices, Systems, And Methods For Testing Crash Avoidance Technologies" filed on Apr. 27, 2012 by Joseph Kelly et al; U.S. patent application Ser. No. 13/532,366 entitled "Devices, Systems, And Methods For Testing Crash Avoidance Technologies" filed on Jun. 25, 2012 by Joseph Kelly et al (issued as U.S. Pat. No. 8,428,863); U.S. patent application Ser. No. 13/532,383 entitled "Devices, Systems, And Methods For Testing Crash Avoidance Technologies" filed on Jun. 25, 2012 by Joseph Kelly et al (issued as U.S. Pat. No. 8,428,864); U.S. patent application Ser. No. 13/532,396 entitled "Devices, Systems, And Methods For Testing Crash Avoidance Technologies" filed on Jun. 25, 2012 by Joseph Kelly et al (issued as U.S. Pat. No. 8,457,877); U.S. patent application Ser. No. 13/532,417 entitled "Devices, Systems, And Methods For Testing Crash Avoidance Technologies" filed on Jun. 25, 2012 by Joseph Kelly et al; and U.S. patent application Ser. No. 13/532,430 entitled "Devices, Systems, And Methods For Testing Crash Avoidance Technologies" filed on Jun. 25, 2012 by Joseph Kelly et al. Each of these patent applications is incorporated herein in their entirety including all tables, figures, and claims.

As Advanced Crash Avoidance Technologies (ACATs) such as Forward Collision Warning (FCW), Crash Imminent Braking Systems and other advanced technologies continue to be developed, the need for full-scale test methodologies that can minimize hazards to test personnel and damage to equipment has rapidly increased. Evaluating such ACAT systems presents many challenges. For example, the evaluation system should be able to deliver a potential Soft Collision Partner (Soft CP) reliably and precisely along a trajectory that would ultimately result in a crash in a variety of configurations, such as rear-ends, head-ons, crossing paths, and sideswipes. Additionally, the Soft Collision Partner should not pose a substantial physical risk to the test driver, other test personnel, equipment, or to subject vehicles in the event that the collision is not avoided. This challenge has been difficult to address. Third, the Soft CP should appear to the subject vehicle as the actual item being simulated, such as a motor vehicle, a pedestrian, or other object. For example, the Soft CP should provide a consistent signature for radar and other sensors to the various subject vehicles, substantially identical to that of the item being simulated. It would be also advantageous for the Soft CP to be inexpensive and repeatably reusable with a minimum of time and effort.

As disclosed in the inventors' previous patent applications, fully incorporated herein by reference, the Guided Soft Target (GST) system includes a dynamic motion element (DME) as a mobile and controllable platform that carries the Soft CP. The DME is of such shape and dimension that it can be run over by the vehicle under test (aka the subject vehicle), with little to no damage to either the DME or the subject vehicle. When a collision occurs with the GST system, the subject vehicle impacts the Soft CP, which then absorbs the collision and may collapse and/or separate from the DME. Such a Soft CP is disclosed in U.S. patent application Ser. No. 13/532,366 (issued as U.S. Pat. No. 8,428,863), incorporated by reference. This is disclosed fully in the previous patent applications listed above and incorporated by reference.

Pedestrian Automatic Emergency Braking (PAEB) systems and automated or self-driving vehicles are two rapidly advancing technologies which require real-world, full-scale testing through the use of static and moving pedestrian dummies. For many PAEB systems or autonomous vehicle sensors, dummy motion (including striding legs) is a very important feature for the correct classification of a sensed object as a pedestrian. For radar systems, the striding motion of the legs creates a characteristic micro-Doppler effect which can be used to help classify a moving object as a pedestrian. For camera-based systems, a characteristic feature of the pedestrian's gait is the contact of the foot with the ground, where a gap (light) can no longer be seen below the foot, and the foot can be observed to be stationary with respect to the ground for the duration of the stance phase of the pedestrian's gait.

Many advanced driver assistance systems (ADAS) as well as automated vehicles (AV) or self-driving vehicles, rely on these characteristics to correctly identify a moving object as a pedestrian, in order to avoid false positive activations of automatic braking or other collision avoidance strategies. As such, test dummies are required to exhibit these same characteristics in order to properly evaluate the system under test. Currently, some pedestrian dummies can meet some, but not all, of the required characteristics. The current systems have a number of shortcomings.

First, a widely-used articulating, strikable pedestrian dummy called 4ActivePA presents hard components after a collision. The 4ActivePA dummy features hip joints and legs that magnetically detach from hip articulation servo motors that are rigidly attached to a central pole that runs continuously from the top of the head of the dummy to the ground. The legs attach to these servo motors at the top of the upper leg via a structure that somewhat mimics a human femur bone. Once detached during a collision with a striking vehicle, hard attachment points between the servo motors and the "femur" are exposed, which can contact the body panels or windshield of the striking vehicle, causing damage to the striking vehicle. Also, since the attachment mechanisms between the "femur" and servo motor are exposed, they can contact the pavement and be damaged themselves, hindering the ability to re-attach the legs to the servo motors.

Second, other systems have a rigid attachment of the limbs to servos which can damage the articulation mechanism. Specifically, the rigid mechanical coupling of the articulation servo and the limb can result in back-driving the servo assembly with large transient loads which can easily damage the servo drivetrain (gears). Maximum torque ratings for servos are generally quoted for quasi-static loading, and do not consider the effects of back-driving the drivetrain, which can introduce a substantial reflected inertia due to very high gear ratios, which can be in excess of 400:1. In such cases, highly transient loadings can easily damage gear teeth, rendering the servo inoperable after even one collision between a vehicle and the dummy.

Third, some current pedestrian dummy systems rely on tubular structures glued into foam to serve as bones within the articulating limbs. This presents several potential challenges, including minimization of the potential for damage to the dummy, or to the striking vehicle, as well as properly affixing the bones to the surrounding foam which makes up the bulk of the limbs. In the case of strikable dummies, the stiffness of each component must be carefully considered, and it is undesirable to have components that are unnecessarily stiff in axes where stiffness is not required to transmit articulating forces and moments, as these can become sources for potential damage to the striking vehicle, as well as possibly becoming failure points within the dummy structure. Using tubular structures has the disadvantage that the area moment of inertia (i.e., a major contributor to stiffness) is the same for all cross-sectional axes, and also has high torsional area moment of inertia. For the purposes of transmitting articulating forces and moments from the drive in the joint to the limb, only one axis of high stiffness is required, and all other stiff axes serve only to increase the risk of inflicting damage on the striking vehicle. Further, the high torsional area moment of inertia can cause any twisting motion in the limb to generate large shear forces between the tube and the foam to which it is glued, causing a failure and possible loss of retention of the limb.

Fourth, some pedestrian dummy systems employ a small number of pre-determined hip motion profiles as functions of time, and not necessarily as functions of position. This can result in limb articulation motions that are not coupled to the actual forward motion of the dummy. For example, once activated, the hip servo motors can begin to articulate the legs before forward motion is achieved, or at a rate that does not match the actual forward motion. This type of system assumes that the means of transport (moving platform or gantry motion) will eventually match the motion of the limbs, but there is no closed loop means of achieving this in real-time.

Fifth, some pedestrian dummy systems require an onboard controller. This can restrict the types of gait replication to be achieved, since only a few pre-determined, pre-programmed gait profiles are loaded, which can be selected by a user through a remote-control selector. Also, the onboard controller can be relatively heavy or bulky, and is put at risk to damage, since it resides in the dummy which is intended to be struck at relatively high speeds by a motor vehicle. Offboard controllers can provide the user with additional features and functionality, but can require a cabled connection between the servo motors and the controller, which is remotely situated. In the case of a dummy that is intended to be separable from its carrying apparatus (e.g., moving platform, gantry, etc.), the presence of wires or cables requires a breakaway connection, which needs to be reliably disconnected in the event of a collision with a striking vehicle.

Therefore, an articulating pedestrian dummy system that overcomes these shortcomings would be advantageous. The system should realistically replicate the gait of a pedestrian, while being capable of being struck repeatedly by a vehicle without appreciable damage to either the striking vehicle or the dummy, including the articulation system.

SUMMARY OF THE INVENTION

The present invention provides an elegant solution to the needs described above and offers numerous additional benefits and advantages, as will be apparent to persons of skill in the art. The objectives of the present invention may include reducing damage to striking vehicle and pedestrian dummy, improving ease of use, improving durability of articulation mechanism (e.g., servo motors) and allowing for tuning of various gaits using a parametric approach. Particular features may include: soft plug and socket attachment of limbs, no internal, separate skeleton structure within torso section, slipper clutches installed at articulation joints to minimize shock loading of servo drivetrain, bone structures that make use of tuned compliances, wireless control of articulation angles, and articulation angles computed by software, allowing for customization of gait via parameters.

An articulating pedestrian dummy for testing crash avoidance technologies in a subject vehicle is disclosed that includes a human-shaped torso with a first and second leg socket. A leg plug is inserted into each of the leg sockets forming a first and second detachable connection. An upper leg is connected to each leg plug and can rotate relative to the leg plug. The torso, leg plugs and upper legs are comprised of foam or other soft, elastically deformable material. The first and second detachable connections are sufficiently yielding so as to detach leg sockets from the leg plugs upon impact with the subject vehicle and sufficiently yielding so as to impart minimal force to the subject vehicle upon impact, the force causing minimal to no damage to the subject vehicle.

The torso may also include an arm socket and the dummy may also include an arm plug inserted into the arm socket forming a third detachable connection. An arm may be connected to the arm plug and can rotate relative to the arm plug. Similarly, the torso may also include a neck socket and the dummy may also include a neck plug inserted into the neck socket forming a third detachable connection. A head may be connected to the neck plug and can rotate relative to the neck plug. A pole plug may be inserted into a pole socket on the torso forming a third detachable connection. A support pole may be connected to the pole plug, and the pole may be connected to a moving platform.

The upper legs may comprise a fabric covering, and may be connected to a lower leg through a joint. Either the upper leg or the leg plug may include a first electric servo that rotates the upper leg relative to the leg plug. When the upper leg is connected to a lower leg, a second electric servo may be included that rotates the lower leg relative to the upper leg. A clutch assembly may be mechanically connected to the servos to prevent damage to the servo. Servos may also be used with the arms and the head to articulate those joints.

Control and power of the servos may be accomplished through soft contacts, with a battery and servo controller in the torso, or through batteries and servo controllers in each of the limbs. The servo controller may have a wireless receiver and the batteries may be removable.

The limbs may have a tuned compliance bone, wherein the rotation of the limb defines a rotation plane, and the limb includes a tuned compliance bone with a bending axis that is substantially orthogonal to the rotation plane, wherein the bone is at least 30 times stiffer about the orthogonal bending axis than about an axis that lies substantially within the rotation plane.

A method for creating a realistic human gait for a dummy is also disclosed. The dummy may have a leg with an articulating hip joint and knee joint. The method includes: (a) define the duration of the stance phase and swing phase within the gait cycle; (b) determine the position of the dummy within the gait cycle; (c) calculate a knee angle based on: (1) the position of step (b), and (2) whether the position is in the stance phase or the swing phase; (d) calculate a hip angle based on: (1) the knee angle of step (c), (2) the position of step (b), and (3) whether the position is in the stance phase or the swing phase.

The calculation in step (c) may be approximated by a haversine function, and the calculation in step (d) may be approximated by a cosine and arctangent functions when in the stance phase. The stance phase need not be equal in time to the swing phase.

The method can be used to create a look-up table by repeating steps (b)-(d) for discrete positions within the gait cycle and storing those values. The gait cycle has a range of 0% to 100% and the discrete positions of step (e) are separated by an interval of at least 1%, or more preferably at most 5% of the gait cycle.

The method may be used to calculate the hip and knee angles of a second leg of the articulating dummy because the legs are out of phase by 180 degrees. The method includes (a) determine a first set of knee and hip angles for a desired position within the gait cycle based on the look-up table; (b) determine a second set of knee and hip angles for a position that is 180 degrees out of phase with the desired position in step (a) based on the look-up table; (c) transmit the first set and second set to a dummy with a first leg comprising a first articulating hip joint and a first articulating knee joint, and a second leg comprising a second articulating hip joint and a second articulating knee joint; (d) actuate the first leg based on the first set; (e) actuate the second leg based on the second set.

A system with a remote controller and an articulating dummy may implement these methods.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION

Figure 1:
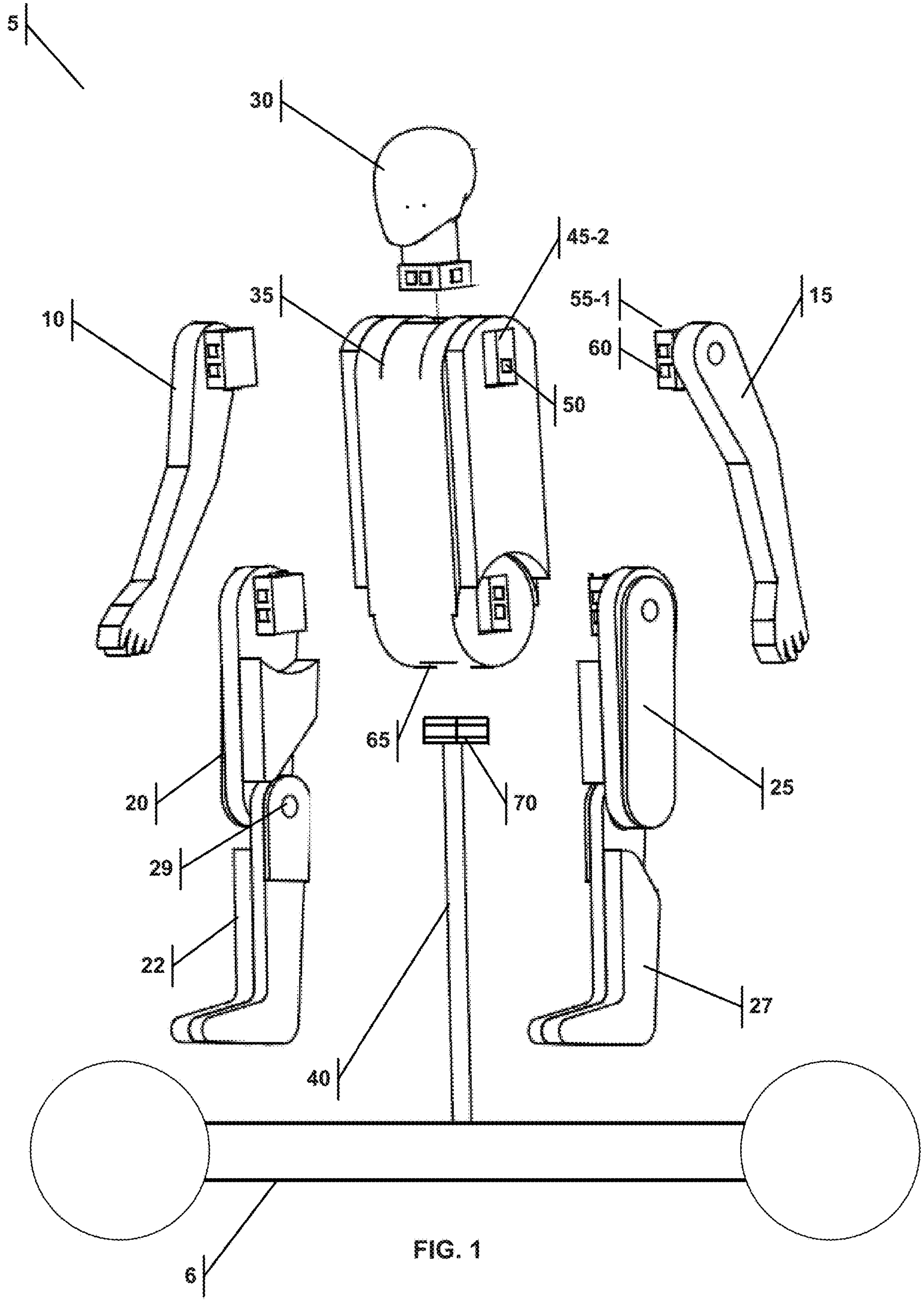
FIG. 1 illustrates an exploded view of an articulating pedestrian dummy with soft electrical contacts and foam sockets.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with the attached figures and is provided for ease of reference, where like reference numerals designate corresponding features throughout the specification and figures:

Articulating Pedestrian Dummy 5
Articulating Pedestrian Dummy 5A
Dynamic Motion Element 6
Arm 10
Arm 10A
Arm 15
Arm 15A
Upper Leg 20
Upper Leg 20A
Lower Leg 22
Upper Leg 25
Upper Leg 25A
Lower Leg 27
Leg Joint 29
Head 30
Torso 35
Support Pole 40
Neck Foam Socket 45-1
Arm Foam Socket 45-2
Leg Foam Socket 45-3
Socket Soft Electrical Contacts 50
Neck Foam Plug 55-1
Arm Foam Plug 55-2
Leg Foam Plug 55-3
Plug Soft Electrical Contacts 60
Pole Foam Socket 65
Pole Foam Plug 70
Soft Battery Module 75
Battery Module Compartment 80
Servo Controller 85
Neck Control Line (Socket Soft Electrical Contacts) 90-1
Arm Control Line (Socket Soft Electrical Contacts) 90-2
Upper Leg Control Line (Socket Soft Electrical Contacts) 90-3
Lower Leg Control Line (Socket Soft Electrical Contacts) 90-4
Negative Line (Socket Soft Electrical Contacts) 95
Positive Line (Socket Soft Electrical Contacts) 100
Arm Control Line (Plug Soft Electrical Contacts) 105-1
Upper Leg Control Line (Plug Soft Electrical Contacts) 105-2
Lower Leg Control Line (Plug Soft Electrical Contacts) 105-3
Negative Line (Plug Soft Electrical Contacts) 110
Positive Line (Plug Soft Electrical Contacts) 115
Servo/Clutch Assembly 120
Limb Battery 125
Wireless Receiver/servo Controller 130
Servo 135
Clutch Assembly 140
Nut 140-1
Spring Washer 140-2
Steel Clutch Plate 140-3
Clutch Friction Element 140-4
Attachment Flange 140-5
Bushing 140-6
Cotter Pin 140-7
Clutch Shaft 140-8
Servo Mount 140-9
Foam Limb Cover 145-1
Foam Limb Element 145-2
Tuned Compliance Bone 145-3
Foam Limb Cover 145-4
Bone Stiffer Axis 150
Articulation Axis of the Joint 155

Remote Controller 160

In order to overcome the limitations of the prior art detailed above, a new articulating dummy system is disclosed herein that minimizes the amount of onboard equipment, optimizes structural compliances to minimize damage to the dummy and striking vehicle, and employs a new articulation angle computation software and a new method of housing the servo motors in order to minimize the presence of "hard" components presented after a collision. Specifically, the systems disclosed herein:

- eliminates hard exposed components after collision. The articulation servo motors are housed within the soft (e.g., foam) limb itself, having a soft (e.g., foam) plug attached to the output shaft of the servo, which is directed inward toward the torso for the purpose of separably coupling the limb to the torso. On impact with a striking vehicle, the soft plug and limb do not separate from each other, but the plug is dislodged from its mating socket in the torso. In this way, the detachment of the servo motor and limb assemblies from the torso does not result in exposing hard, potentially damaging components of the internal mechanisms of the dummy. Further, the soft plug/socket attachment methodology does not require any hard internal structure within the dummy torso. This design results in a strikable pedestrian dummy that has no exposed hard components when it disassembles on impact with a striking vehicle, and minimizes shock loading of the servo drivetrain.
- may have a load-limiting clutch between the servo output and the actuated limb to limit the high loads that can be seen at the servo output shafts which can result in damage to the servo drivetrain. A compact, adjustable-preload clutch was developed to be placed between the servo and the actuated limb.
- may use non-circular cross-section elements within the limbs to reduce bending stiffness along axes where bending stiffness is not required for the transmission of articulation moments and forces. These elements have high area moments of inertia in the axes that contribute to articulation force and moment transmission, but low area moments of inertia in axes that do not. Using flat, rectangular-section elements with relatively low torsional area moments of inertia, reduces the tendency of the bone elements to shear away from the foam at the glue interfaces. Further, the flat section bone elements can be formed such that they partially encompass the foam limb material, increasing the robustness of the bone to foam glue joint, reducing the likelihood of failure in repeated collisions between the dummy and the striking vehicle.
- may be controlled by software that computes the individual articulation angles of each controlled joint (e.g., hip, knee, shoulder, neck, etc.) as a function of user-defined parameters and the measured position of the dummy within its gait cycle, using either speed or position as input. Thus, the joint articulation angles are coordinated with the forward motion of dummy.
- may use offboard joint articulation angle computation and wireless transmission to dummy.

Referring to FIG. 1 an articulating pedestrian dummy 5 is presented, comprising a torso 35, a head 30, arms 10, 15 and legs (upper legs 20, 25 connected to lower legs 22, 27 via leg joint 29). The torso 35, constructed from foam (or other elastically deformable material), contains neck foam socket 45-1, arm foam sockets 45-2 and leg foam sockets 45-3. For additional support, the torso 35 may have a pole foam socket 65 that may receive a pole foam plug 70 connected to a support pole 40. The support pole 40 may be mounted to a dynamic control element (DME) 6, providing a platform on which the dummy may be transporting during vehicle testing. DME construction and operation is fully disclosed in the inventors' prior applications listed above and incorporated herein by reference.

The limbs and neck may attach to the sockets with detachable foam plugs. The limbs attached to these sockets may be either be passive or active. Actively articulated joints (e.g., hip, shoulder or neck) utilize specially housed servo motors in the individual limbs, whose output shafts attach at the torso socket locations via soft foam plugs and slipper clutches.

The foam plugs are constructed of foam (or other soft, elastically deformable material) and a fabric covering. The torso, head and limbs may also be constructed of foam (or other soft, elastically deformable material) and a fabric covering. The joint articulation servo motor may be completely enclosed within the foam and fabric limb, such that there are no hard components exposed to a striking vehicle when the limb is detached from the torso at the plug/socket interface. The servo articulation axis is therefore attached to the detachable limb.

The connection between the foam plug and the corresponding socket is detachable and should be sufficiently yielding so as to detach from each other upon impact with the subject vehicle, and should be sufficiently yielding so as to impart minimal force to the subject vehicle upon impact, thus causing minimal to no damage to the subject vehicle.

Figure 2B:
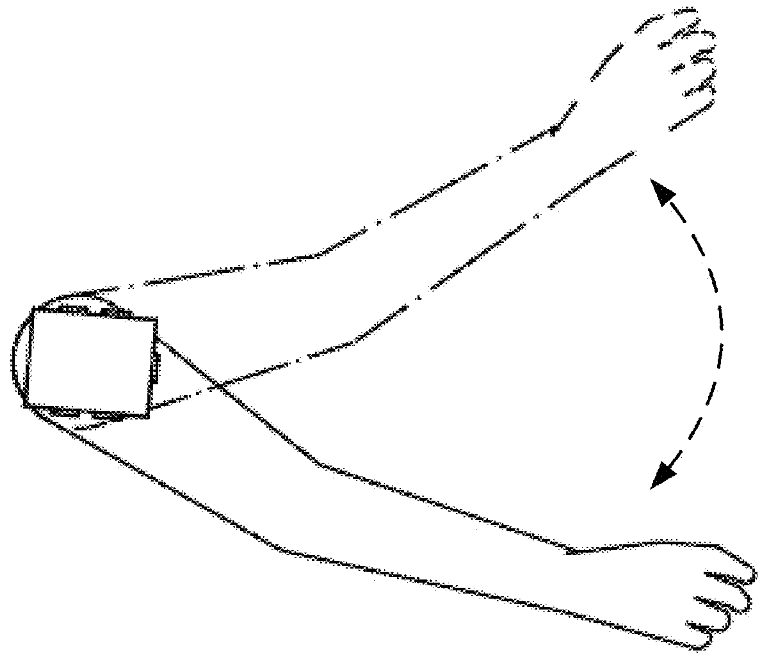
FIG. 2B illustrates the swinging movement of the arm.
Figure 2A:
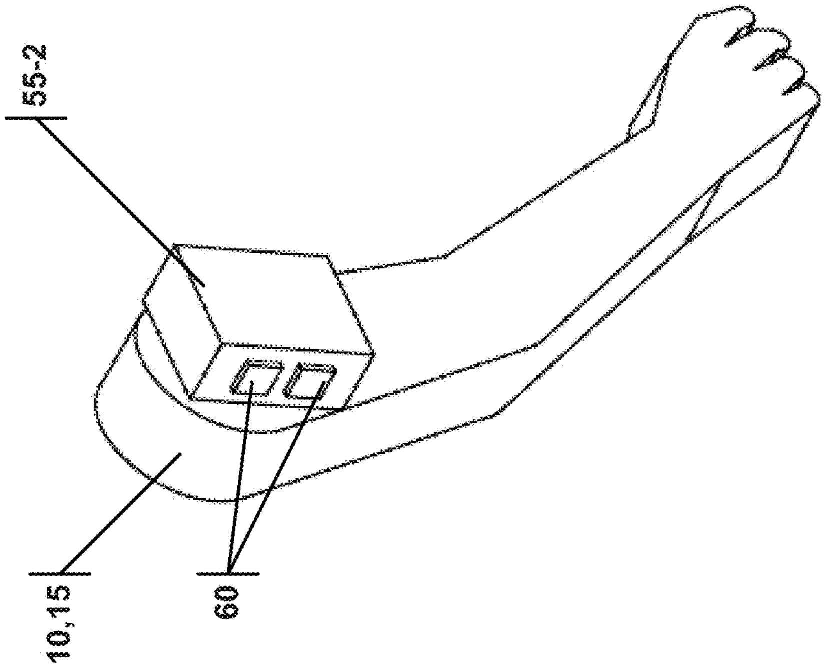
FIG. 2A illustrates an arm with an arm foam plug to be used as part of the dummy of FIG. 1.
Figure 2C:
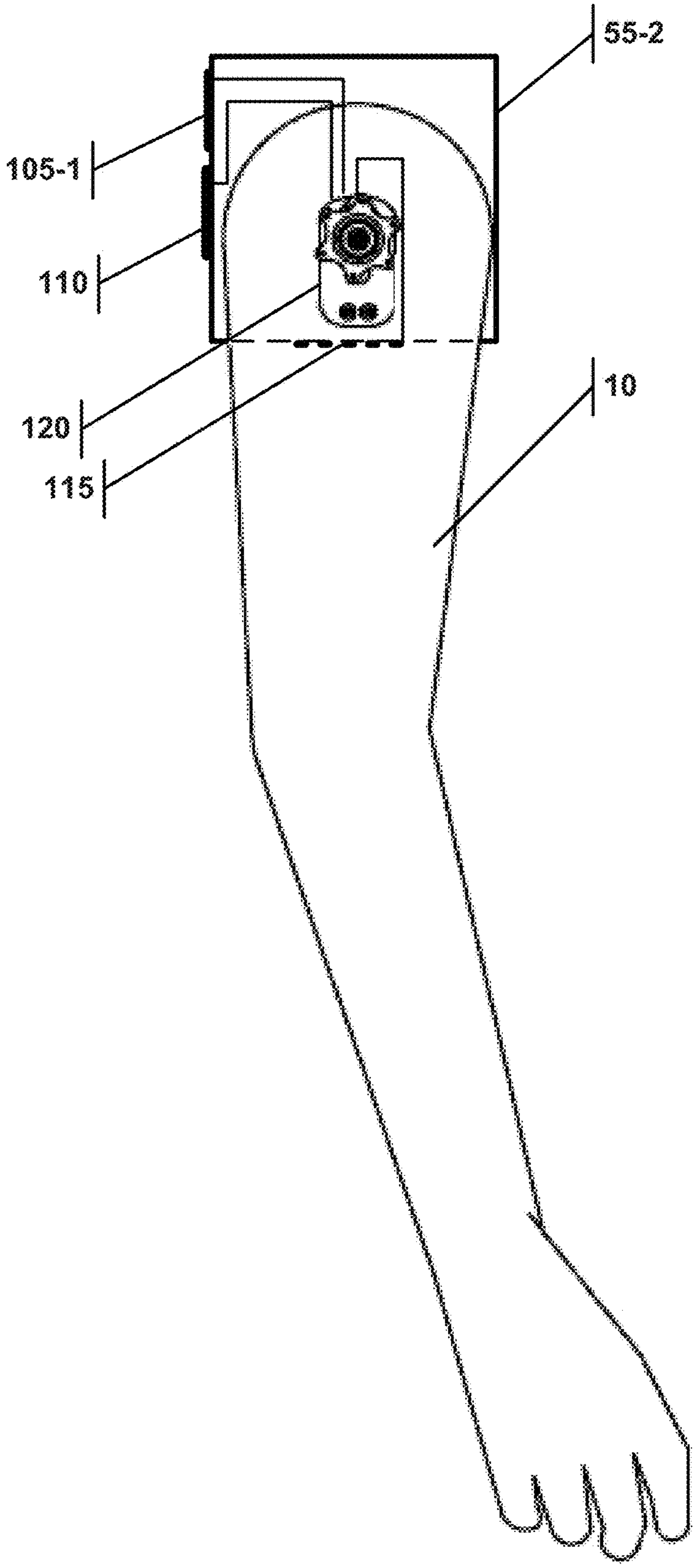
FIG. 2C illustrates the arm in cross section, detailing the servo/clutch assembly and soft electrical contacts.

Power can be provided to the servo/clutch assembly 120 within the plug via soft, flexible contacts incorporated into the fabric skin of the plug, which correspond to the locations of flexible contacts within the mating socket on the torso. Additionally, servo control signals can be passed from the torso to the limb servo by way of the same type of flexible contact, when a single battery and receiver are housed in the torso. FIG. 2A illustrates the arm 10, with arm foam plug 55-2 with soft electrical contacts 60. The foam plug as shown has a cross section that is rectangular, but may be a variety of shapes. It is preferable that the shape is keyed, such that it does not rotate within the corresponding socket on the torso. Alternatively, or in addition to the keyed shaped, the foam plug and the corresponding socket may be of a tight friction fit such that the plug does not rotate in the socket. However, the friction fit is not as preferred because the dummy should disassemble upon impact, and a tight fit may prevent such disassembling, causing damage to the dummy or the impacting vehicle. FIG. 2C illustrates the servo/clutch assembly 120 inside the arm 10, that rotates the arm 10 relative to the arm foam plug 55-2. The servo/clutch assembly 120 is connected to an arm control line 105-1 that is, in turn, connected to an exposed soft electrical contact 60 on the surface of the arm foam plug 55-2. Similarly, the power lines (negative line 110 and positive line 115) are connected to soft electrical contact 60 on the surface of the arm foam plug 55-2.

Figure 3B:
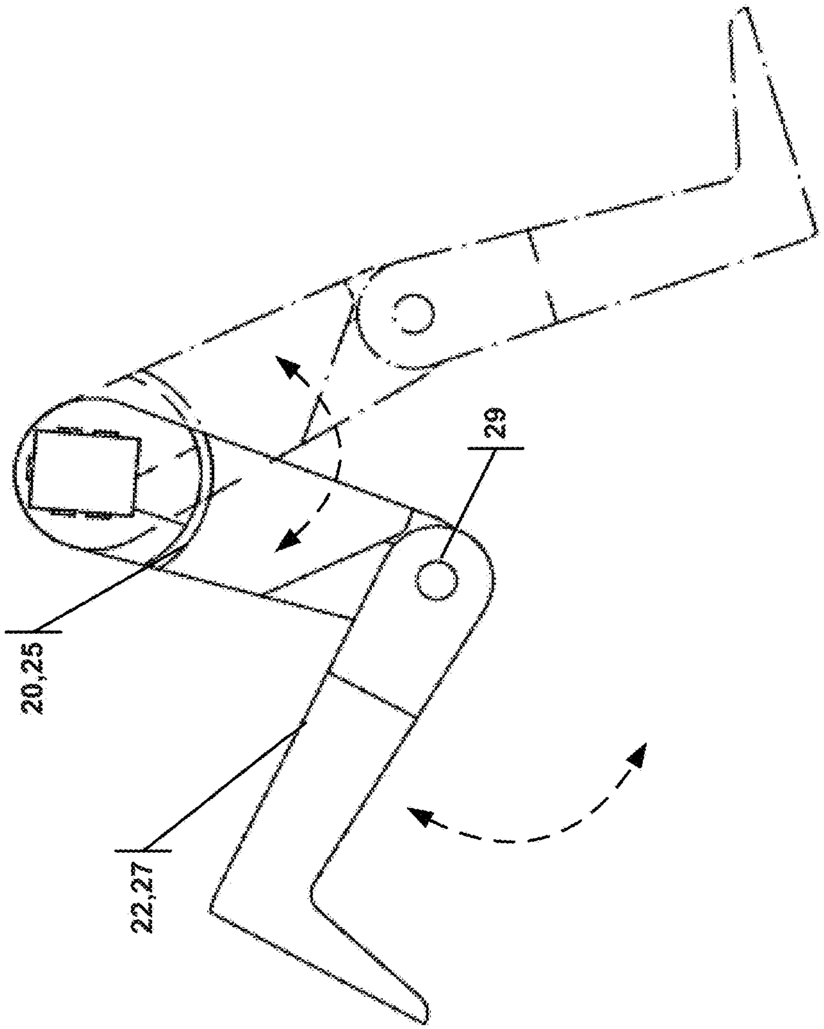
FIG. 3B illustrates the swinging movement of the upper leg and lower leg.
Figure 3A:
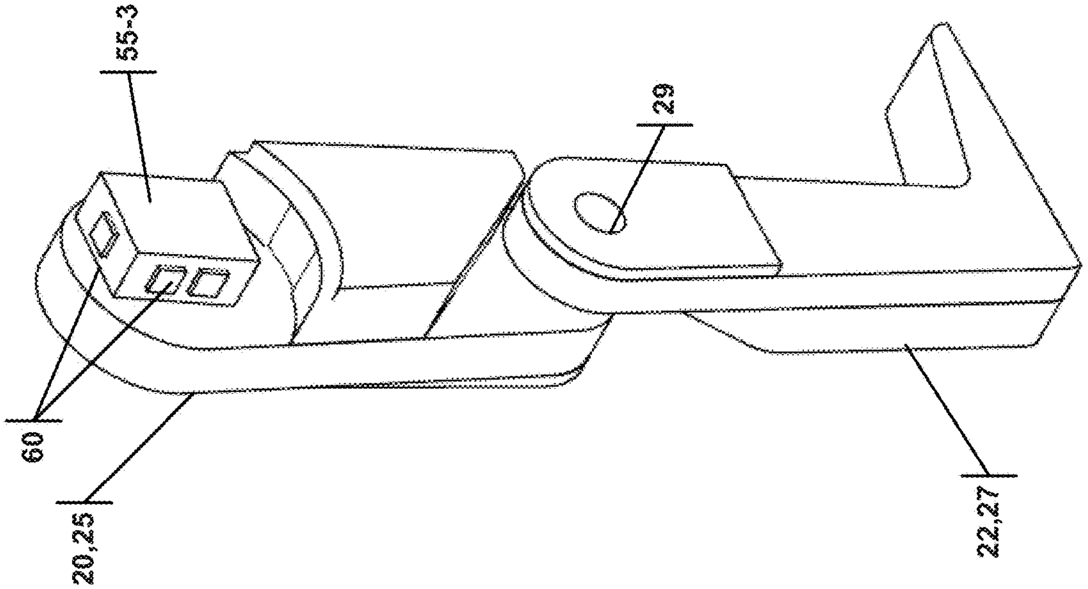
FIG. 3A illustrates a leg (upper and lower leg) with a leg foam plug to be used as part of the dummy of FIG. 1.
Figure 3C:
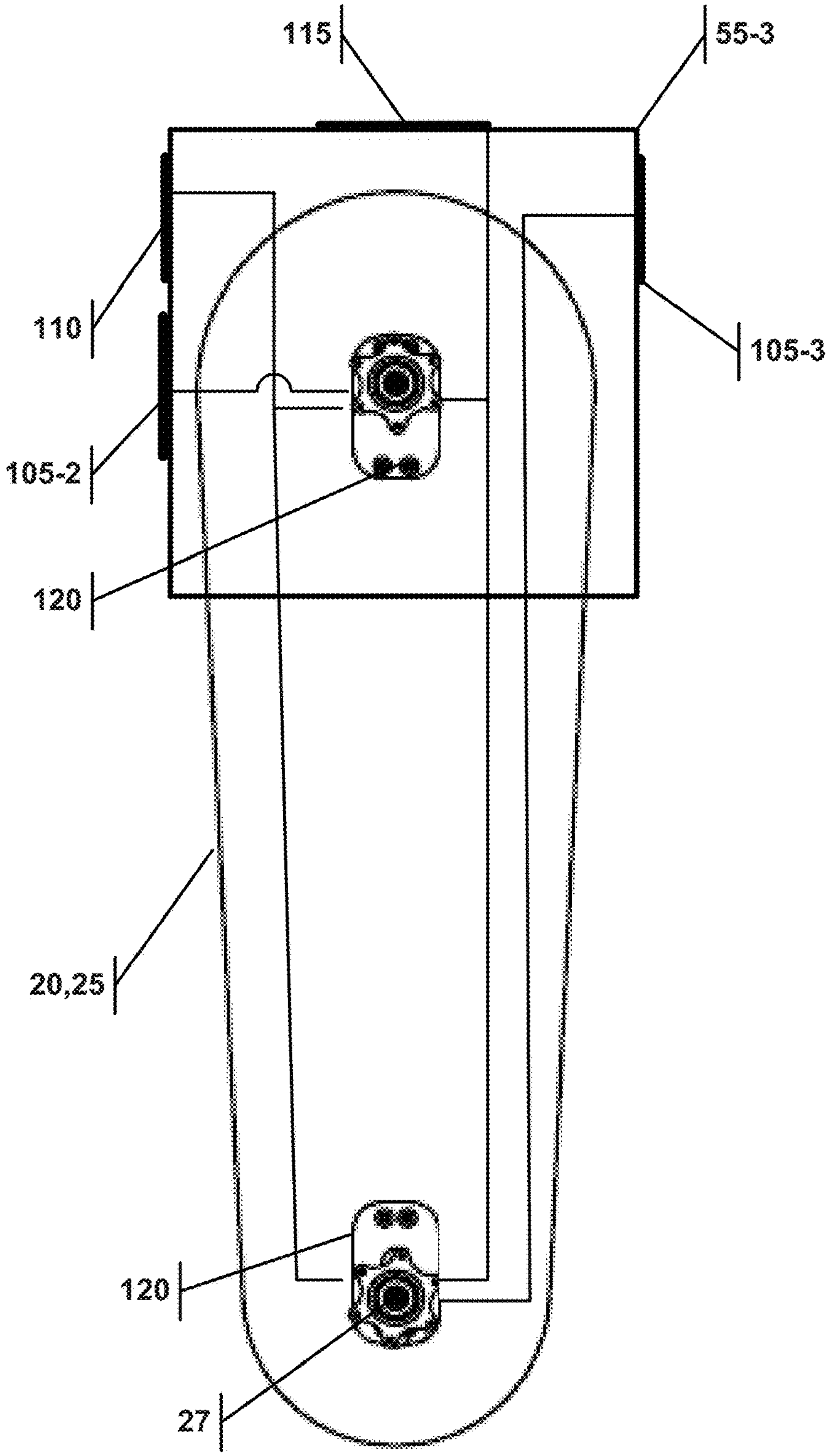
FIG. 3C illustrates the upper leg in cross section, detailing the servo/clutch assemblies and soft electrical contacts.

Like the arm 10, the upper leg 20 also has a leg foam plug 55-3 with soft electrical contacts 60 as shown in FIG. 3A. The upper leg 20 may have two control lines (upper leg control line 105-2 and lower legal control line 105-3) to control the two servo/clutch assemblies 120 in the leg. Those lines are connected to the soft electrical contact 60 on the surface of the leg foam plug 55-3, as are the power lines (negative line 110 and positive line 115).

Figure 4A:
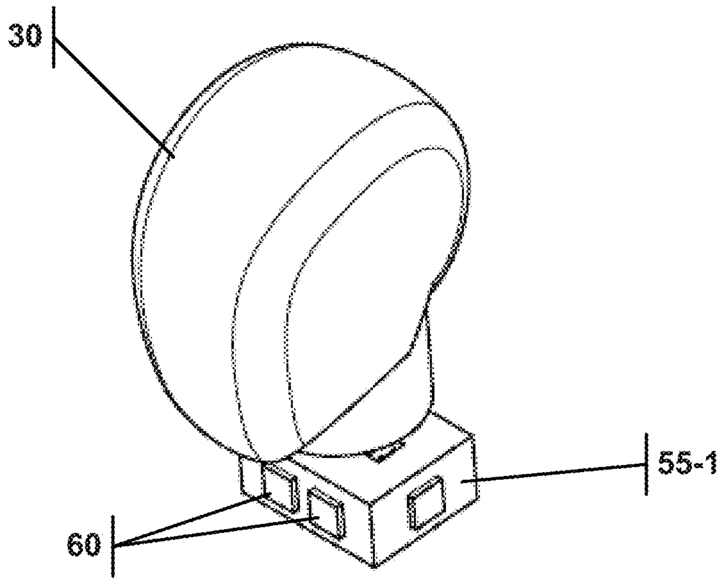
FIG. 4A is a top isometric view of a head with a neck foam plug to be used as part of the dummy of FIG. 1.
Figure 4B:
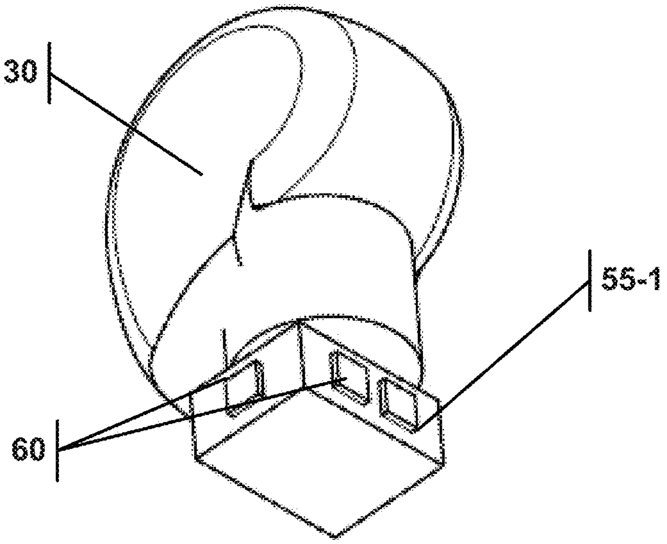
FIG. 4B is a bottom isometric view of the head with a neck foam plug to be used as part of the dummy of FIG. 1.
Figure 5B:
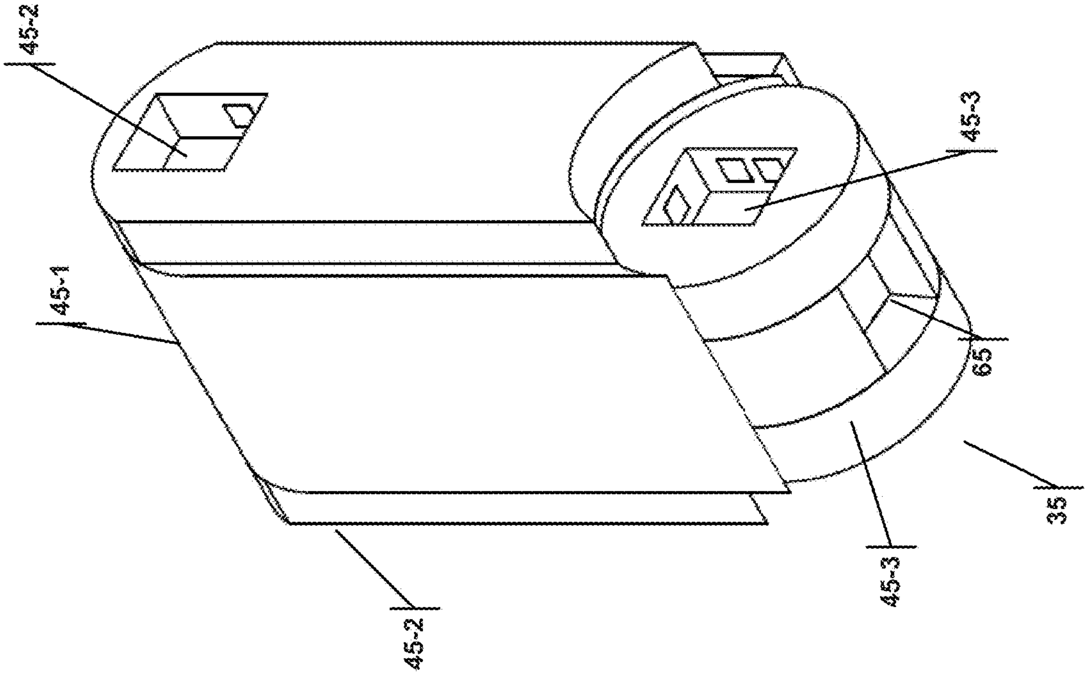
FIG. 5B is a bottom isometric view of the torso with various sockets to be used as part of the dummy of FIG. 1.
Figure 5A:
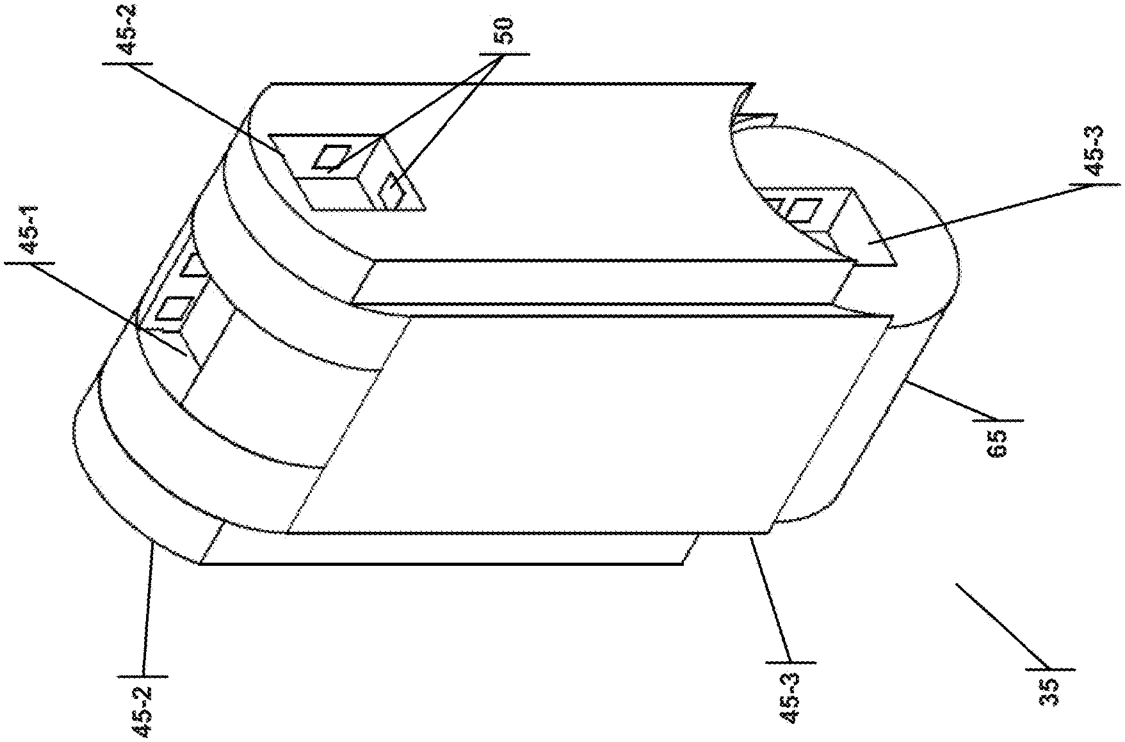
FIG. 5A is a top isometric view of a torso with various sockets to be used as part of the dummy of FIG. 1.

The head 30 may also have soft contacts 60 for power and control of an internal servo motor, as shown in FIGS. 4A and 4B.

The torso 35 may have neck foam socket 45-1, two arm foam sockets 45-2 and two leg foam sockets 45-2 as shown in FIGS. 5A-6B. Within these sockets may be positioned soft electrical contact 50, that correspond to the soft electrical contacts 60 on the foam plugs. FIG. 6C is a cross sectional view from FIG. 6A taken along line 6C-6C. Within the torso 35 may be a battery module compartment 80 that provides a negative line 95 and a positive line 100 to soft electrical contacts on each of the sockets. A servo controller 85 may have separate control lines to each of the sockets. For example, the arm foam socket 45-2 may have a control line 90-2, and the leg foam socket 45-3 may have a upper leg control line 90-3 and a lower leg control line 90-4. There may be independent control lines for the opposite side limbs as well, providing independent control of each limb. The servo control 85 may also include a wireless receiver or be connected to a separate wireless receiver, to receive control instructions from a remote device. The torso 35 may have a removable soft battery module 75.

Figure 6B:
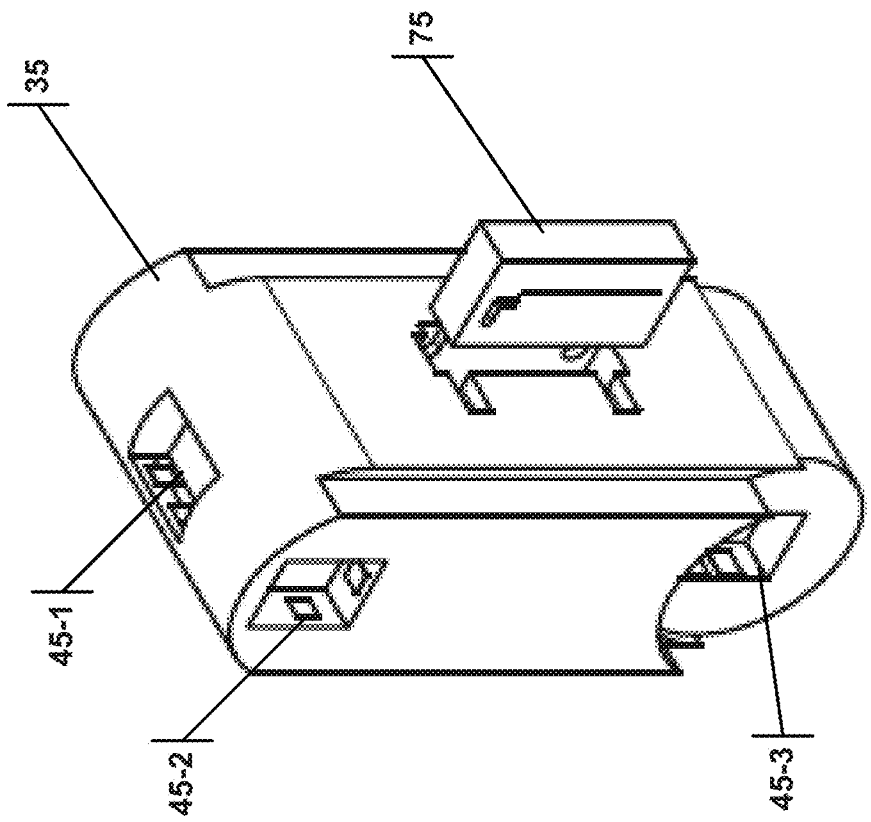
FIG. 6B is a top isometric view of the torso with various sockets and a battery module.
Figure 6A:
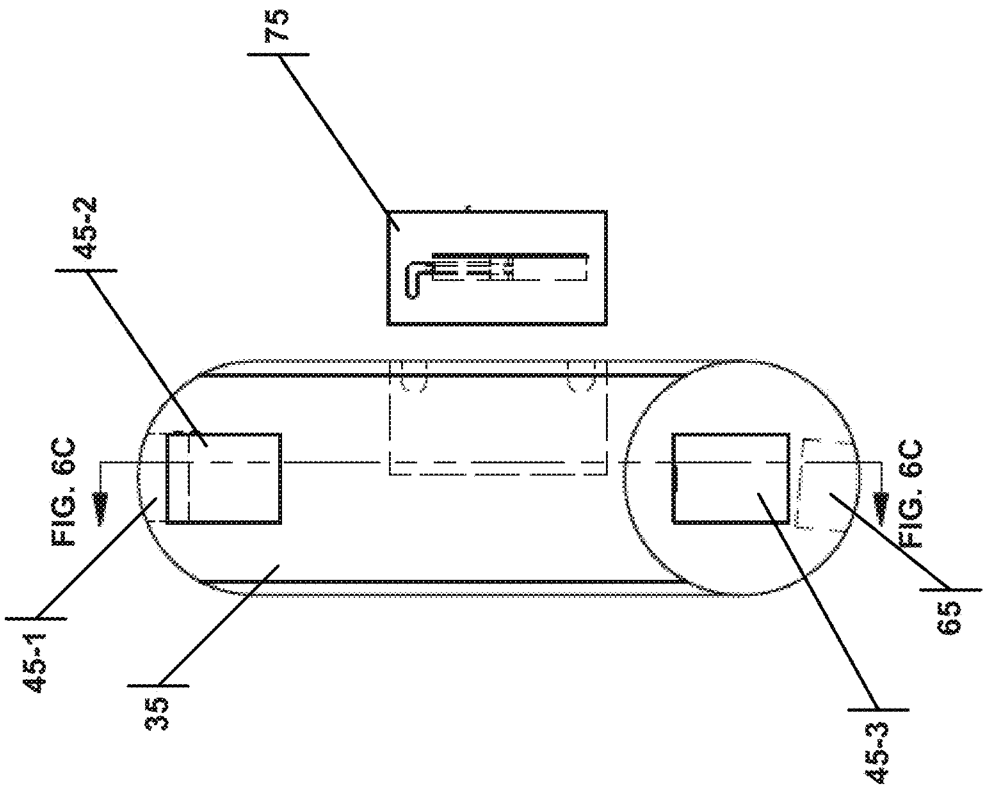
FIG. 6A is a side view of a torso with various sockets and a battery module.
Figure 6C:
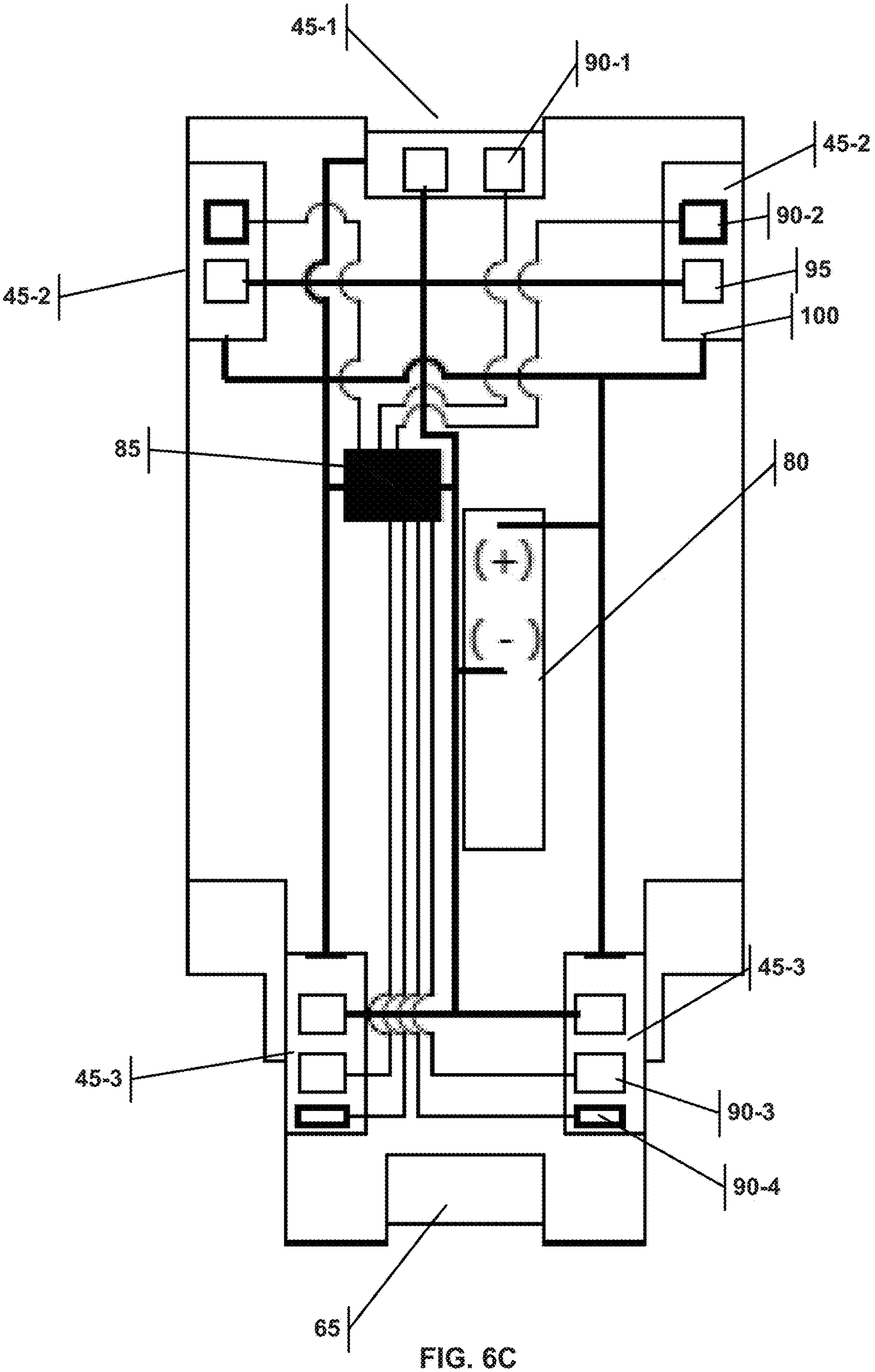
FIG. 6C is a cross-sectional view of the torso illustrating the power lines, control lines, servo controller and soft contacts.

While FIGS. 6A-6C disclose the battery module 75 and servo controller 85 within the torso 35, it is also possible to locate those components outside of the torso, and provide the electrical connection through the soft contacts already described. For example, the servo controller 85 (with a wireless receiver) and battery module 75 may be housed in the head 30, which may be permanently affixed to the torso 35, or removable via the described detachment method. The control and power lines could pass through the torso 35 to the limbs with the structures and techniques already described above. As another non-exclusive alternative, the wireless receiver could be housed in the head 30 with the servo controller 85 and battery module 75 remaining in the torso 35. Raising the location of the wireless receiver may assist in increasing the dummy's wireless signal reception.

Figure 7:
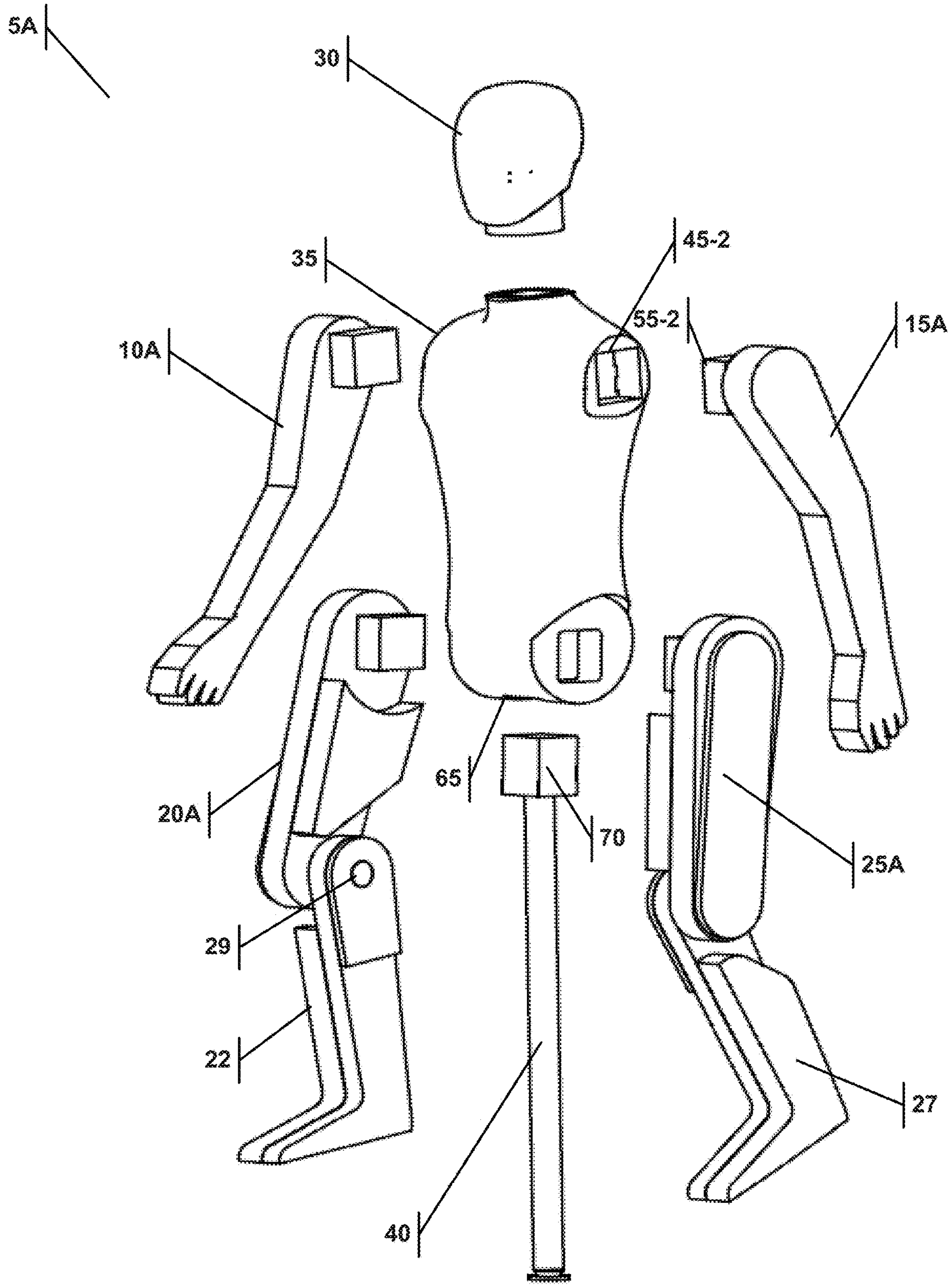
FIG. 7 illustrates an exploded view of an articulating pedestrian dummy with foam sockets, but without soft electrical contacts.
Figure 8:
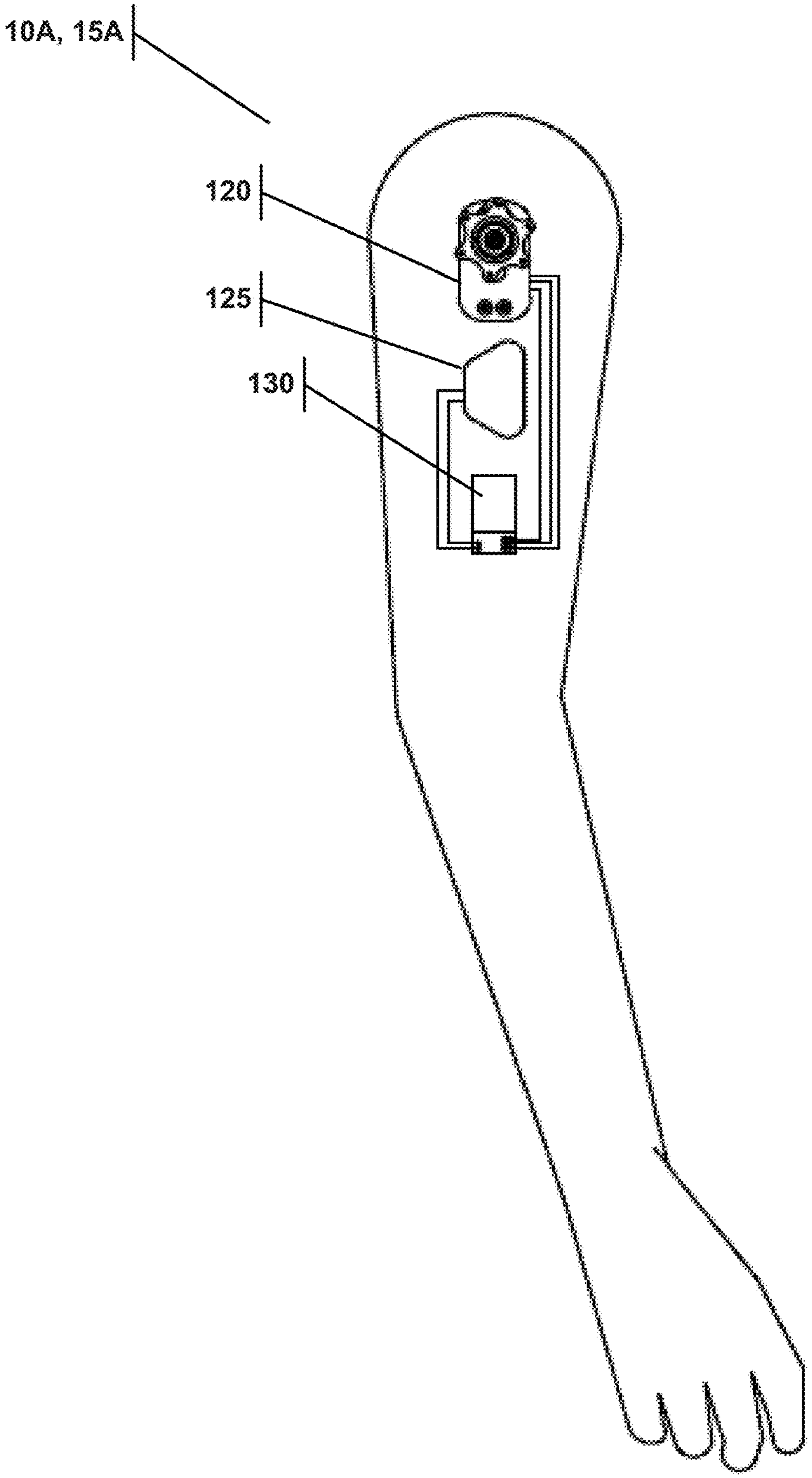
FIG. 8 illustrates an arm in cross section, detailing the servo/clutch assembly, battery and wireless receiver/servo controller to be used as part of the dummy of FIG. 7.
Figure 9:
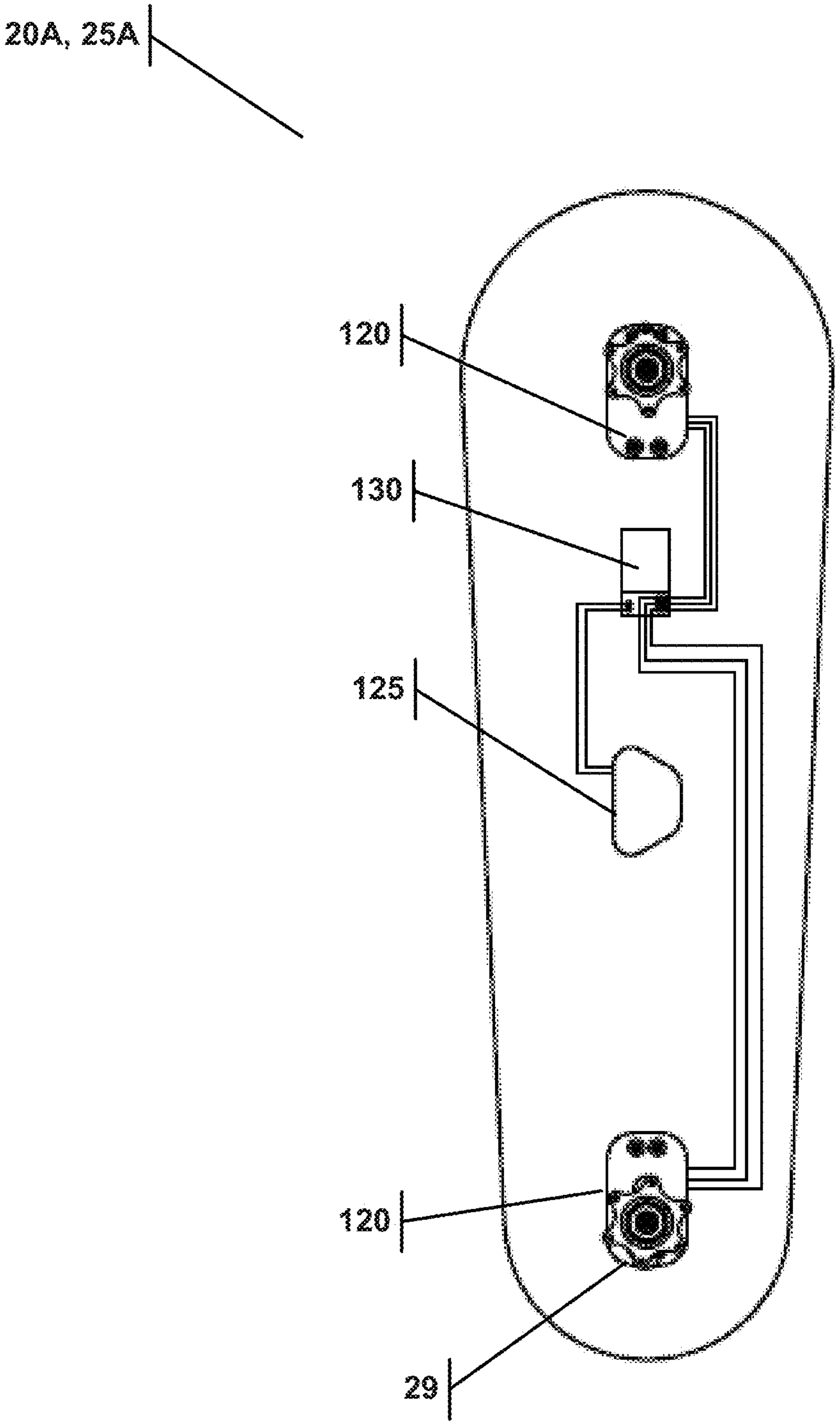
FIG. 9 illustrates an upper leg in cross section, detailing the servo/clutch assemblies, battery and wireless receiver/servo controller to be used as part of the dummy of FIG. 7.

To obviate the need for slip rings and other means of getting power and signal across the rotating joints, the receivers, servos and batteries may be housed entirely in each of the articulated limbs, eliminating the need for electrical contacts at the plug/socket interface. FIG. 7 presents an articulating pedestrian dummy 5A with limbs that have the receivers, servos and batteries may be housed within them. This dummy 5A has many of the same features and structure of the previously disclosed embodiment, but is missing the soft electrical contacts in either the foam sockets or on the foam plugs. FIG. 8 is a cross-sectional view of the arm 10A, 15A, which houses a limb battery 125 connected to a wireless receiver/servo controller 130, which in turn is connected to a servo/clutch assembly 120. The servo/clutch assembly 120 is constructed to rotate the arm 10A, 15A relative to the arm foam plug. FIG. 9 illustrates a cross-sectional view of the upper leg 20A, 25A, which houses a limb battery 125 connected to a wireless receiver/servo controller 130, which in turn is connected to two servo/clutch assemblies 120—one which rotates the upper leg 20A, 25A relative to the leg foam plug, and the other that rotates the lower leg relative to the upper leg 20A, 20B at the leg joint 29. Although not shown, the arm 10A may be comprised of an upper and lower arm, where the upper arm may house battery, wireless receiver/servo controller and two servo/cutch assemblies in order to articulate the shoulder and elbow joints. Lastly, the head can house a battery, wireless receiver/servo controller and servo in order to articulate the neck joint.

The multiple wireless receiver/servo controllers 130 may be paired to a single transmitter, obviating the need for separate transmitter/receiver pairs for each actively articulated limb.

Although the embodiments described above have the clutch/servo assembly in the limb (i.e., the arm or upper leg), the arm foam plug or the leg foam plug may house the clutch/servo assembly, the battery and wireless receiver/servo controller.

Figure 10B:
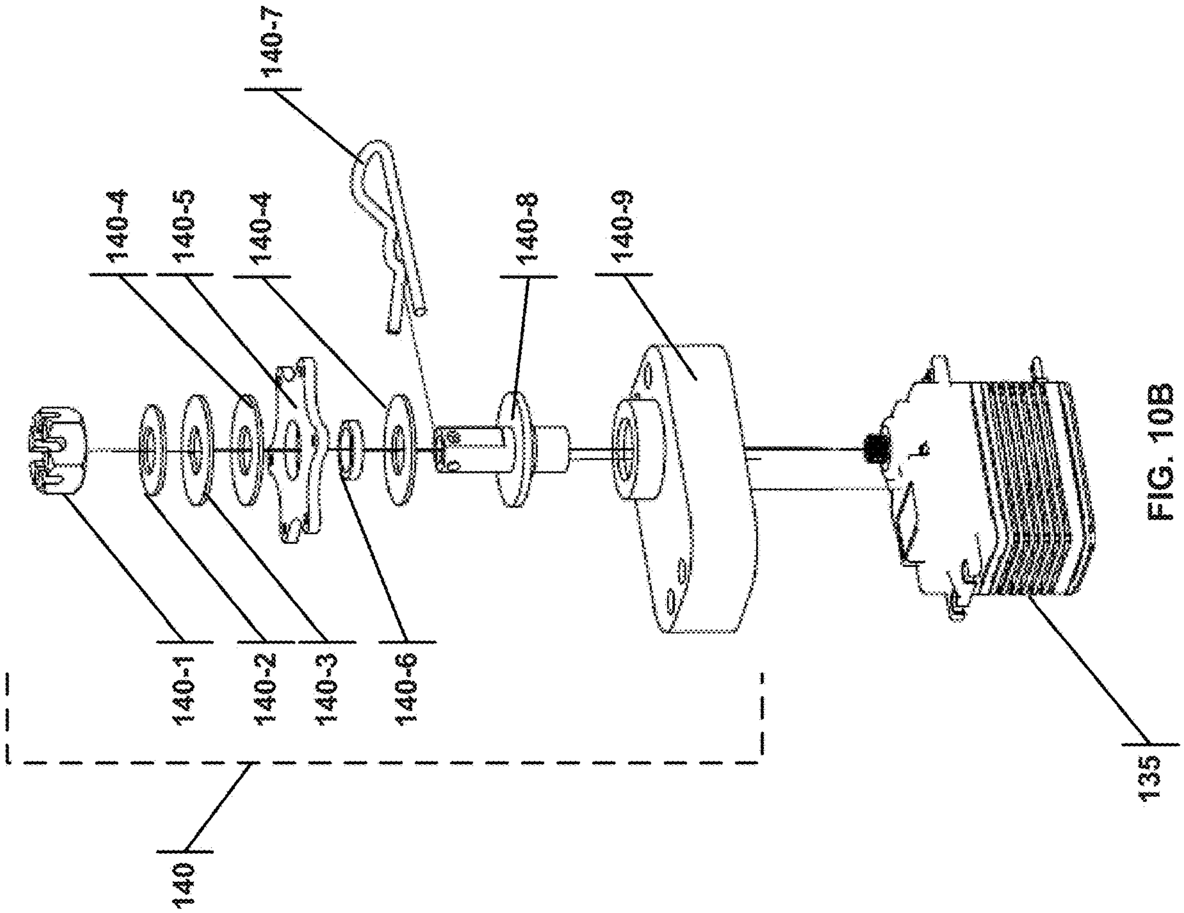
FIG. 10B illustrates the servo/clutch assembly of FIG. 10A in exploded view.
Figure 10A:
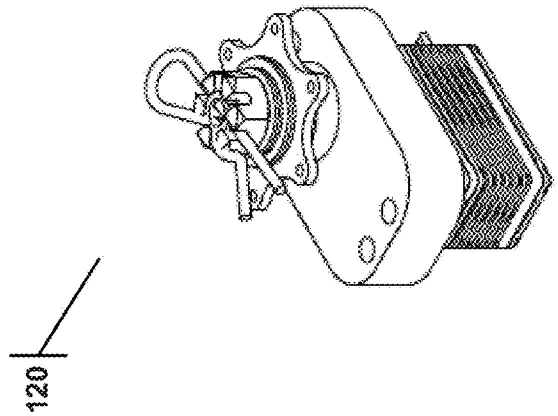
FIG. 10A illustrates a servo/clutch assembly.

At each articulated joint, a clutch assembly is utilized to minimize excessive loading of the servo drivetrain. This is accomplished through the use of a specialized assembly that is situated between the output shaft of the servo and the attachment point on the limb bone. Specifically in FIG. 10A a servo/clutch assembly 120 is shown, and in FIG. 10B the clutch assembly 140 is shown in exploded view. The clutch assembly 140 comprises a clutch shaft 140-8, friction elements 140-4, a steel clutch plate 140-3, and attachment flange 140-5, a spring washer 140-2 and various other elements (nut 140-1, bushing 140-6, cotter pin 140-7 and servo mount 140-9). The clutch assembly 140 is connected to the servo 135. The steel clutch plate 140-3 is indexed to the clutch shaft 140-8, and the spring washer 140-2 provides an axial preload, which can be used to set the breakaway torque of the clutch assembly 140 to something less than the maximum allowable torque for the servo drivetrain.

Figure 11B:
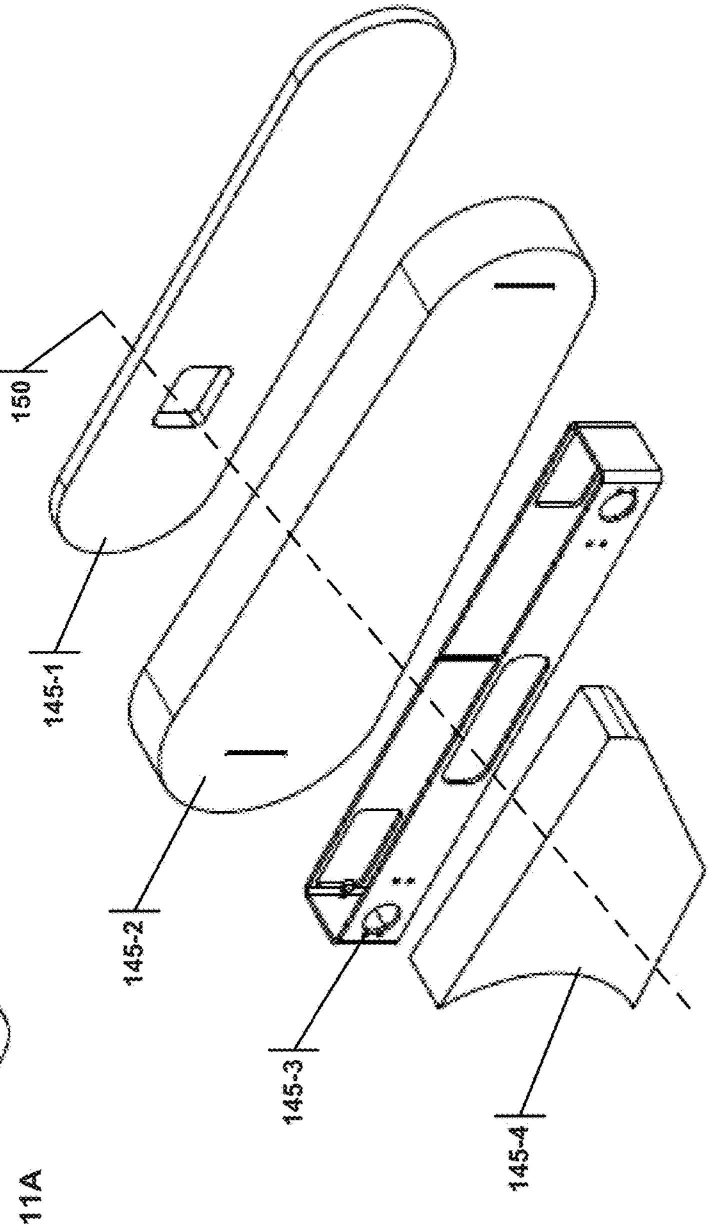
FIG. 11B illustrates the upper leg of FIG. 11A in exploded view.
Figure 11A:
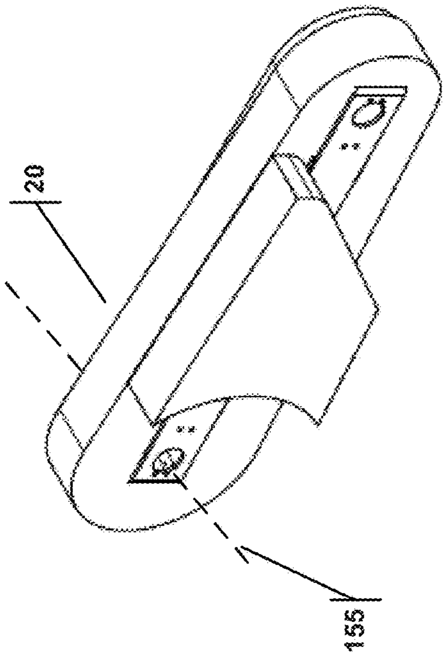
FIG. 11A illustrates an upper leg with a tuned compliance bone.

The structural elements (bones) within each limb are constructed from flat strips of elastically deformable material as shown in FIGS. 11A and 11B. Specifically, FIG. 11A illustrates the upper leg 20, and FIG. 11B shows the upper leg 20 in exploded view. The long, flat bones, also known as a tuned compliance bone 145-3, is oriented within the limb such that the bone stiffer axis 150 (i.e., the axis having the higher area moment of inertia) is aligned with the articulation axis of the joint 155, such that it can effectively transmit the articulation moments from the servo/clutch assembly 120 to the foam limb element 145-2, which is constructed primarily from low density foam, and may be covered by foam limb covers 145-1, 145-4. The tuned compliance bone 145-3 is formed such that it partially encompasses the inner layers of the foam limbs.

Figure 12A:
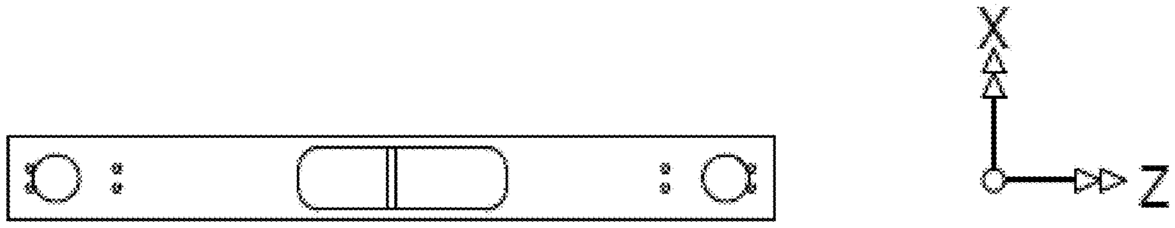
FIG. 12A illustrates the top view of a tuned compliance bone.
Figure 12B:
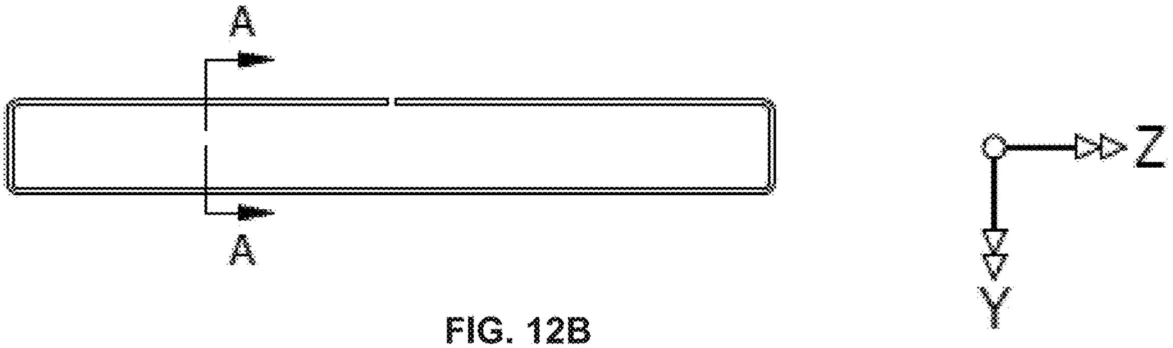
FIG. 12B illustrates a side view of the bone of FIG. 12A.
Figure 12C:
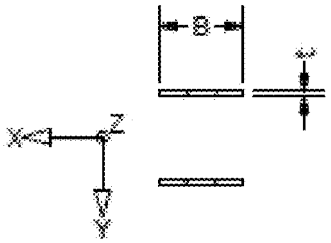
FIG. 12C illustrates a cross-sectional view of the bone of FIG. 12A.

Since the tuned compliance bone 145-3 is captured in, and partially envelops, the foam elements of the limbs, the loading between the tuned compliance bone 145-3 and foam limb element 145-2 is widely distributed, reducing the tendency for failure in the attachment of the foam to the bone. As seen in the cross-section view of the bone, the area moment of inertia of the bones can be computed for the X, Y, and Z axes, considering one side of the bone independently (see FIGS. 12A-12C):

$$I_{XX} = \frac{Bt^3}{12} \tag{1}$$

$$I_{YY} = \frac{tB^3}{12} \tag{2}$$

$$I_{ZZ} = \frac{Bt(B^2 + t^2)}{12} \tag{3}$$

In the example shown here, where the width of the element is 16 times the thickness (i.e., B=16t), the ratio of IYY:IXX=256, meaning that the bending stiffness about the Y axis (in this case, parallel to the axis of joint articulation moments) is 256 times higher than for the bending stiffness about the X axis, allowing the bone to effectively transmit the articulating forces and moments from the articulating joint to the limb foam. A bending stiffness about the Y axis of at least 30 times that about the X axis is preferred. Stated another way, the rotation of the limb relative to the associated plug defines a plane, and the limb contains a tuned compliance bone with a stiff bending axis that is substantially orthogonal to the plane, wherein the bone is at least 30 times stiffer about the orthogonal axis than about an axis lying within the plane of rotation.

This arrangement also serves to minimize the potential for damage to either the dummy or the striking vehicle. This is especially the case where the pedestrian dummy is struck from the side, where the resulting moment to the bone element is about the X axis, in the direction where the bone element is substantially more compliant, and will tend to impart much less loading on the impacting surface of the striking vehicle, which, in turn, will tend to inflict less damage to either the dummy or the vehicle.

Figure 13:
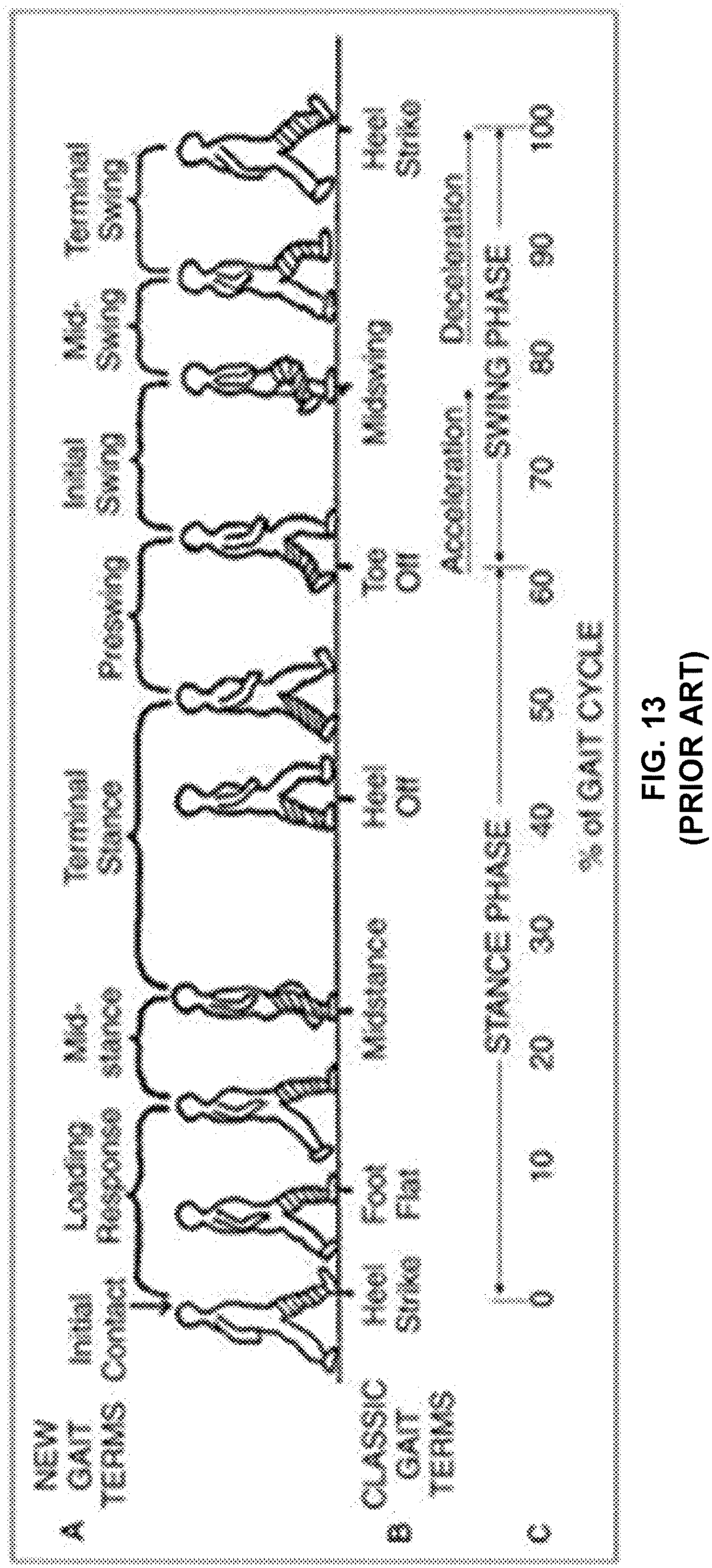
FIG. 13 (PRIOR ART)
FIG. 13 illustrates the various stages/phases of a human gait.

The various joint articulation angles (e.g., hip, knee, shoulder, neck, etc.) are computed as functions of the position of the dummy within its gait cycle. As shown in the FIG. 13, the description of the human gait is broken coarsely into two phases: "Stance" and "Swing" phases, and more finely into the following phases: loading response, mid-stance, terminal stance, pre-swing, initial swing, mid-swing, and terminal swing. What is shown in FIG. 13 are the phases of the leg with the cross-hatch, the opposite leg also experiences the same phases but out of phase by 180° (i.e., 50 percent of the gait).

Figure 14B:
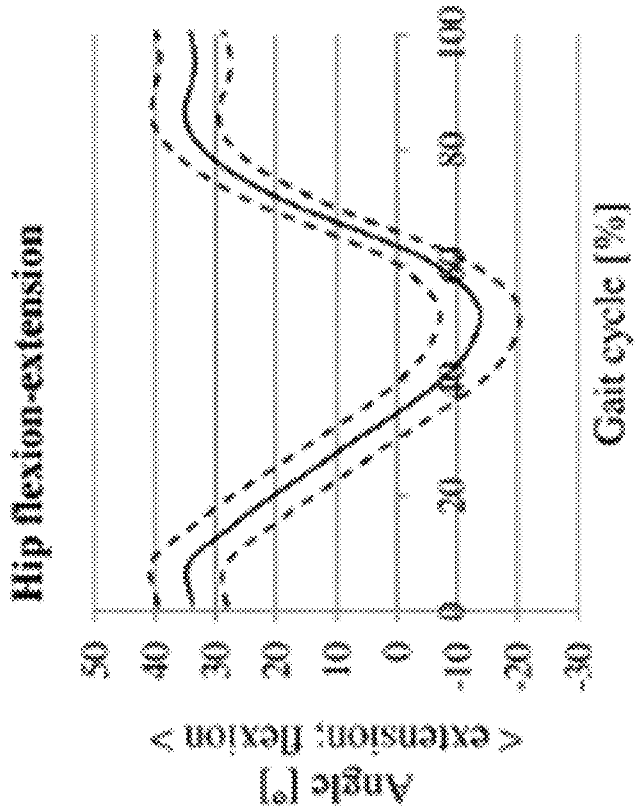
FIG. 14B graphs the hip angle as a function of the percentage of the gait.
Figure 14A:
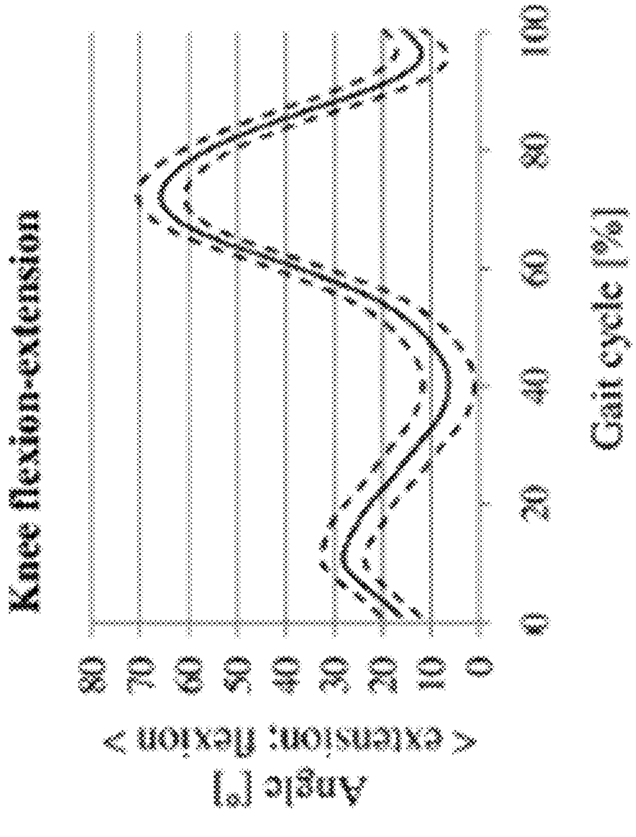
FIG. 14A graphs the knee angle as a function of the percentage of the gait.
Figure 15:
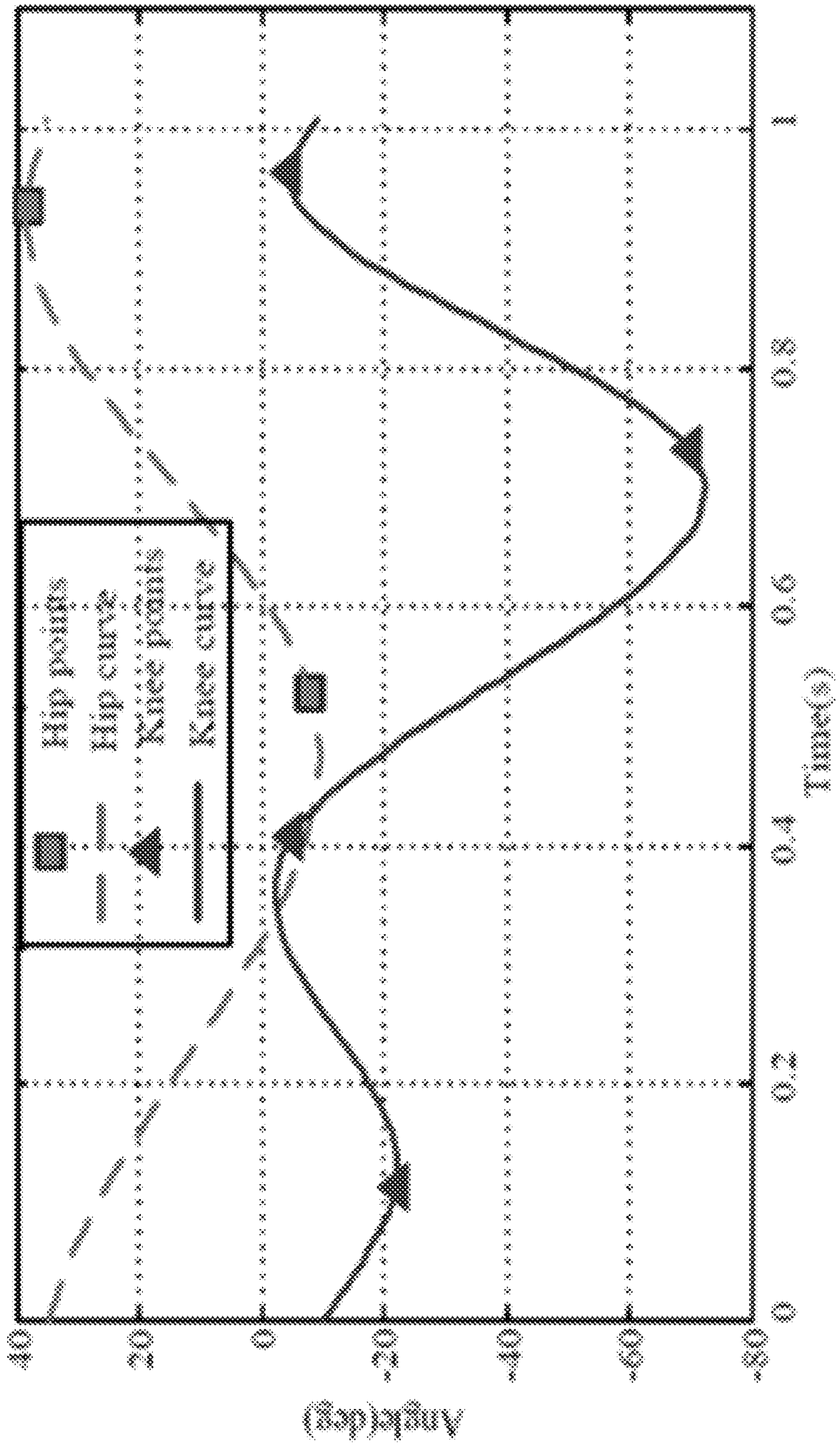
FIG. 15 graphs the knee angle and hip angles as functions of time (for a 1 second gait).

Typical knee and hip flexion-extension angles as functions of percent gait cycle are shown in FIGS. 14A and 14B. Presented in FIG. 15 is the hip and knee angles from a different source. (note that various sources use slightly different angular sign conventions and offsets). For the purposes of the present invention, the function shapes are of more importance than the overall amplitudes or offsets, as these are user-definable parameters in the software. For the purposes of the present invention, a zero degree knee angle is defined as maximum extension (straight leg), with flexion angles represented as positive values. Hip angle is defined as zero degrees when the imaginary line from the hip to knee joints is vertical with respect to the world.

In general terms, computing the hip and knee articulation angles is accomplished via the following steps:

1. Determine position of dummy within the gait cycle as a percentage
2. Compute knee angles based on position of dummy within gait cycle
3. Compute hip angles based on position of dummy within gait cycle, considering previously computed knee angles
   - a. Stance phase—
     - i. Compute ankle "target" position along ground relative to hip point, based on assumption that no slip occurs at ankle position during stance phase
     - ii. Compute hip articulation angle necessary to place ankle point at this "target" stationary position along the ground
   - b. Swing phase—
     - i. Compute ankle "target" position along ground relative to hip point, based on sinusoidal velocity relative to ground, such that the velocity profile (relative to the ground) is constrained to be zero at the beginning and end of the swing phase In computing the articulation angles of the hip and knee joints for each leg, the articulation angle of the knee is first considered. This is accomplished by first determining the position of the dummy hip point within its gait cycle as a percentage. This position can be either measured directly, by means of a position transducer (Global Positioning System or GPS, or encoder, potentiometer, etc.) or by means of a speed or velocity transducer (GPS, tachometer generator, encoder, etc.) which is integrated over time in order to impute a position (i.e., $x=\int v dt$) where $v$=velocity=$dx/dt$. The distance from a defined or arbitrary starting position is then divided by a user-defined stride length (e.g., in meters) and the remainder is considered as the percent location of the hip joint within the gait cycle (i.e., "P").

During the stance phase, the articulation angle of the knee ($\theta_k$) can be approximated by a haversine function (i.e., $\sin^2$) of a parameterized amplitude, with a duration of approximately 55%-65% of the period of the gait. During the swing phase, the knee articulation angle can be approximated by a haversine function of a similarly parameterized amplitude (typically higher amplitude than for the stance phase), with a duration of approximately 35%-45% of the period of the gait (i.e., the complement of the stance phase). The articulation angle computation software allows the user to specify the swing and stance phase amplitudes of the knee articulation, as well as the percent duration of the stance phase. The software then computes the articulation angle of the knee as follows:

$$\theta_{k,stance}(P) = \theta_{k,0} + A_{stance}\sin^2\left[\pi\left(\frac{P - P_{shift}}{P_{stance}}\right)\right] \quad \text{for: } 0 \le x \le x_{stance} \tag{4}$$

$$\theta_{k,swing}(P) = \theta_{k,0} + A_{swing}\sin^2\left[\pi\left(\frac{P - P_{shift} - P_{stance}}{1 - P_{stance}}\right)\right] \quad \text{for: } x_{stance} < x \le 1.0 \tag{5}$$

where:

P=Location of hip joint within gait cycle (0-1)

$P_{stance}$=User-defined stance duration (e.g., 0.6-60%)

$P_{shift}$=User-specified adjustment to timing of stance/swing within gait cycle (Note this parameter is used to adjust the timing of the knee articulation angles within the gait cycle).

$\theta_{knee,\ swing}$=knee articulation angle through the swing phase (deg)

$\theta_{knee,\ stance}$=knee articulation angle through the stance phase (deg)

$\theta_{knee,\ 0}$=knee articulation angle offset (deg)

$A_{swing}$=Amplitude of knee articulation angle through the swing phase (deg)

$A_{stance}$=Amplitude of knee articulation angle through the stance phase (deg)

Figure 16:
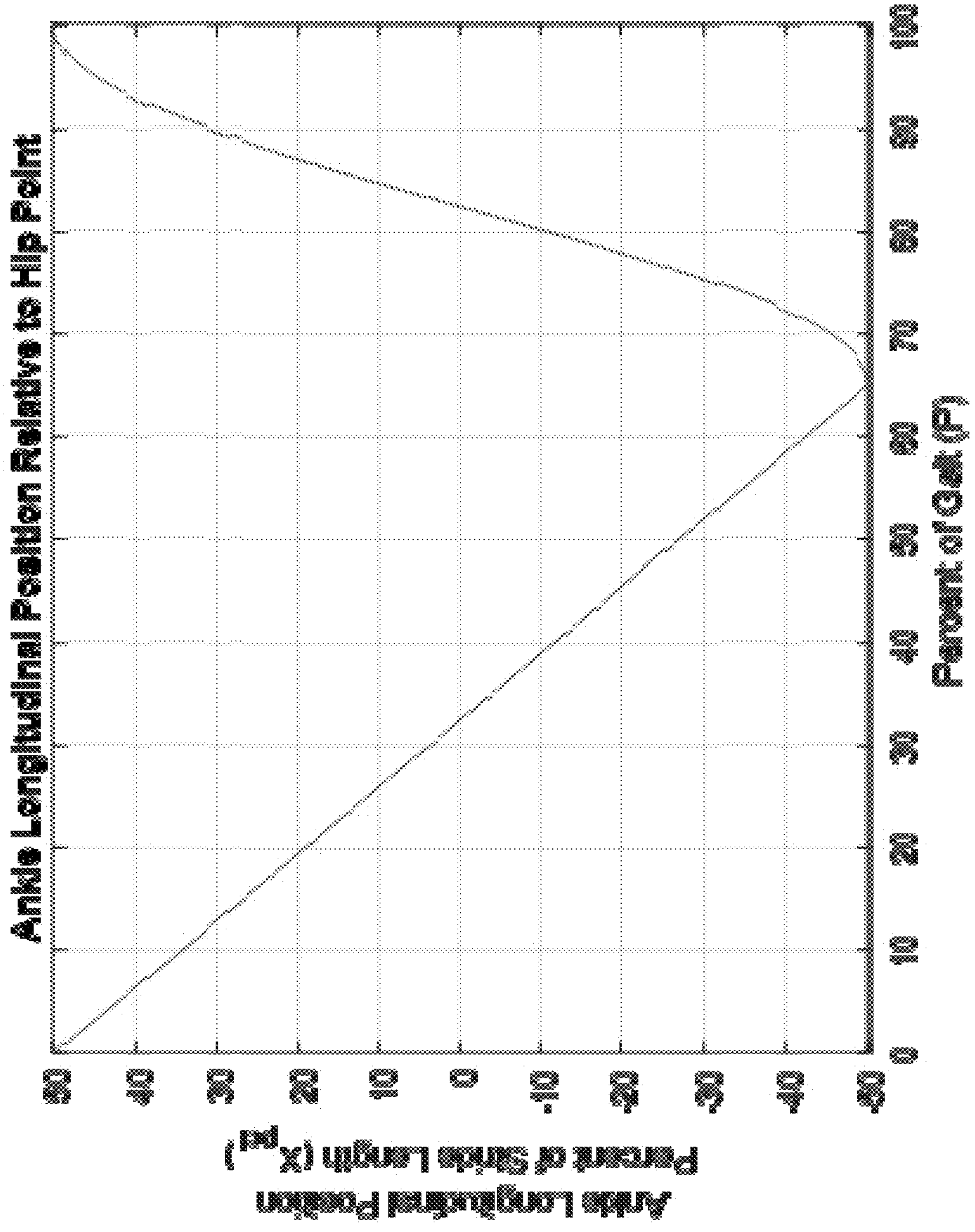
FIG. 16 graphs the ankle longitudinal position relative to the hip point as a function of the percentage of gait.

The hip articulation angle computation is predicated on determining a "target" longitudinal position for the ankle joint relative to the hip point while accounting for the current knee articulation angle. During the stance phase of the gait, the ankle longitudinal position decreases linearly from +50% of the stride length (i.e., in front of the hip point) to −50% of the stride length (i.e., behind the hip point) from 0% gait cycle to the user-defined stance phase duration (e.g., 60-65%). During the swing phase of the gait, the target position moves sinusoidally relative to the hip point from −50% to +50%. Here, the motion is approximated with a cosine function, having a half-period equal to the complement of the stance phase duration. For example, if the stance phase is prescribed to be 65%, the swing phase represents 35% of the gait cycle. FIG. 16 illustrates the "shape" of the target longitudinal ankle position as a function of percent gait cycle. Once the percent of stride length ($X_{pct}$) is determined based on percent gait cycle (P) as shown above, the horizontal distance from hip point to the target ankle position along the ground ($X_m$) is computed as follows:

$$X_{pct} = 50 - 100\left(\frac{P}{P_{stance}}\right) \quad \text{for: } 0 \le P \le P_{stance} \tag{6}$$

$$X_{pct} = -50\cos\left[\frac{\pi(P - P_{stance})}{1 - P_{stance}}\right] \quad \text{for: } P_{stance} < P \le 100 \tag{7}$$

$$X_m = X_{pct} * L_{Stride} \tag{8}$$

where:

P=Percent of Gait Cycle $L_{Stride}$=Stride Length (m)

$X_{pct}$=Longitudinal ankle position, relative to hip point, expressed as a percentage of stride length $X_m$=Longitudinal ankle position, relative to hip point, expressed as a physical distance (e.g., meters, inches, etc.)

The hip angle is then computed to satisfy the ankle longitudinal position constraint:

$$\theta_h = \gamma - \alpha \tag{9}$$

$$\gamma = \sin^{-1}\left[\frac{X_m}{R_{HA}}\right] \tag{10}$$

$$R_{HA} = \{[R_{HK} + R_{KA}\cos\theta_k]^2 + [R_{KA}\sin\theta_k]^2\}^{1/2} \tag{11}$$

$$\alpha = \tan^{-1}\left[\frac{R_{KA}\sin\theta_k}{R_{HK} + R_{KA}\cos\theta_k}\right] \tag{12}$$

where:

$\theta_k$=Knee articulation angle.

$\theta_h$=Hip articulation angle.

α=Angle between upper leg segment and ankle, resulting from knee articulation.

γ=Angle from vertical to the imaginary line connecting the hip and ankle points ($R_{HA}$)

$R_{HK}$=Length of upper leg segment (distance from hip to knee joint)

$R_{KA}$=Length of lower leg segment (distance from knee to ankle joint).

Figure 17B:
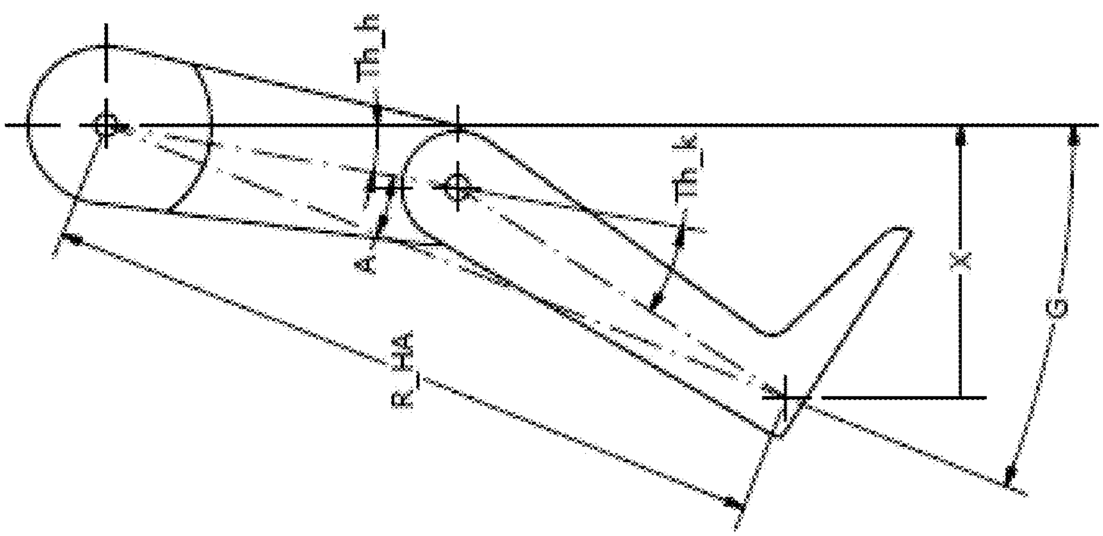
FIG. 17B illustrates various values associated with the upper and lower leg at a second position.
Figure 17A:
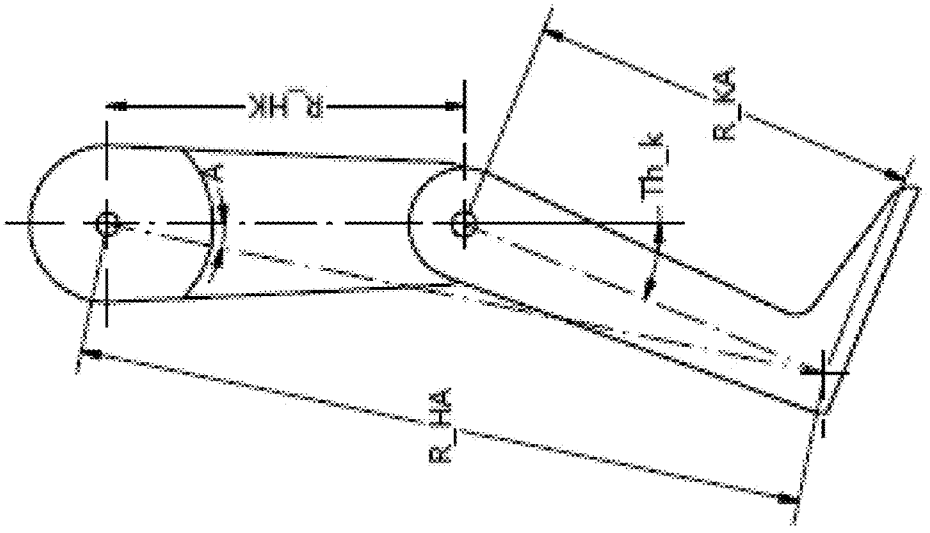
FIG. 17A illustrates various values associated with the upper and lower leg at first position.

$R_{HA}$=Distance from hip to ankle joint $X_m$=Distance along ground from hip to ankle joint The variables and inputs used in Equations (9)-(12) are shown in FIGS. 17A and 17B.

Based on these equations, articulation angles for knee and hip can be computed for each time step. And since the leg motions are out of phase by 180° (i.e., 50 percent of the gait), the opposite leg's knee and hip articulation angles may use the same equations by simply adding an offset of 50 percent "Percent of Gait (P)" computed for the first leg:

$$\theta_{k2} = \text{Equations 4–5 evaluated at} |P-50| \tag{13}$$

$$\theta_{h2} = \text{Equations 6–12 evaluated at} |P-50| \tag{14}$$

where:

$\theta_{k2}$=Knee articulation angle for second leg $\theta_{h2}$=Hip articulation angle for second leg It is also possible to construct a look-up table for the hip and knee angles based on the position within the gait cycle. However, given the speed of processing and the modest calculations needed it is preferable to compute the angles as needed. This also allows the system to re-compute angles "on the fly" if parameters are changed.

Figure 18:
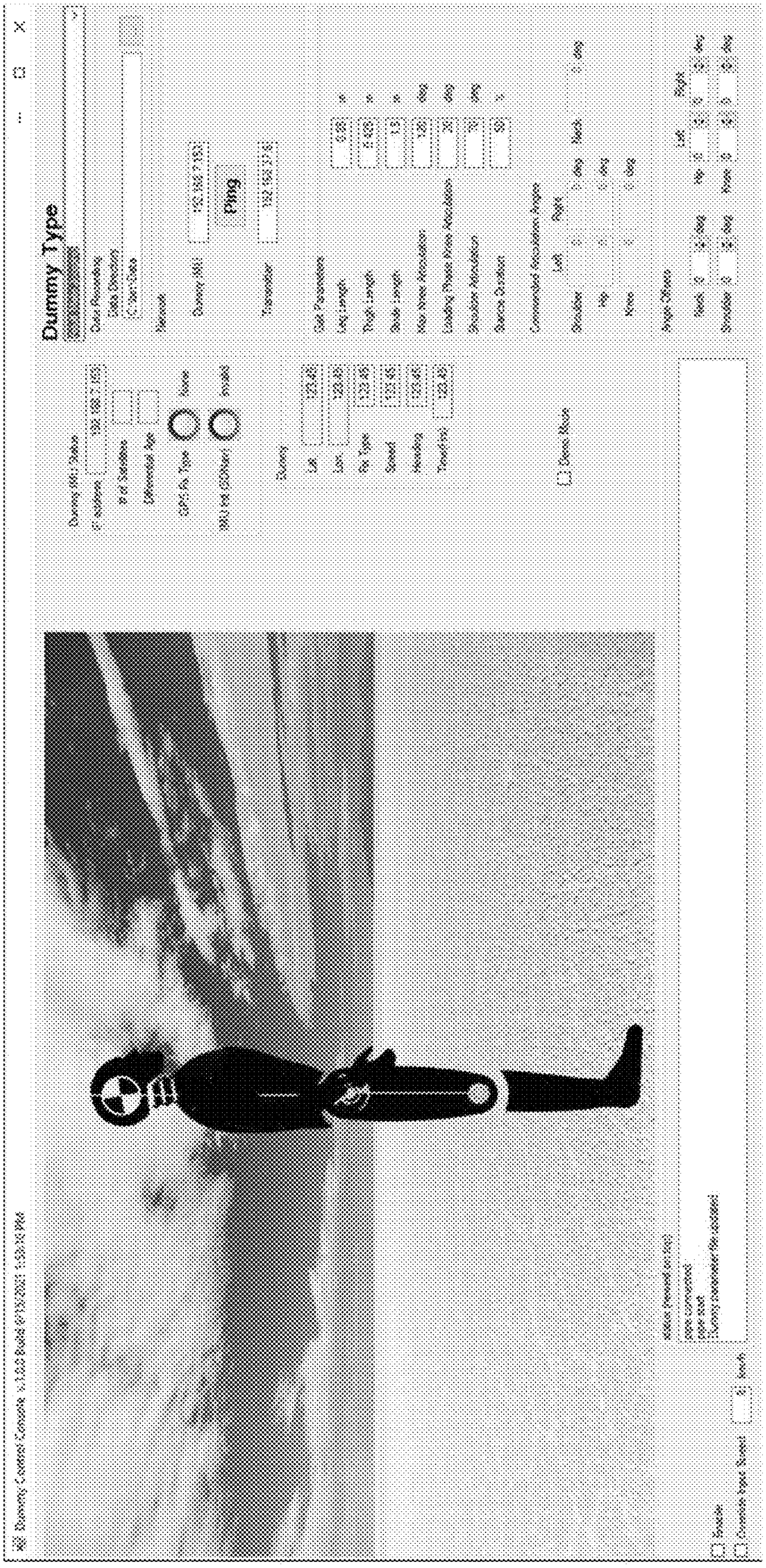
FIG. 18 is a screen shot of a dummy control console.
Figure 19:
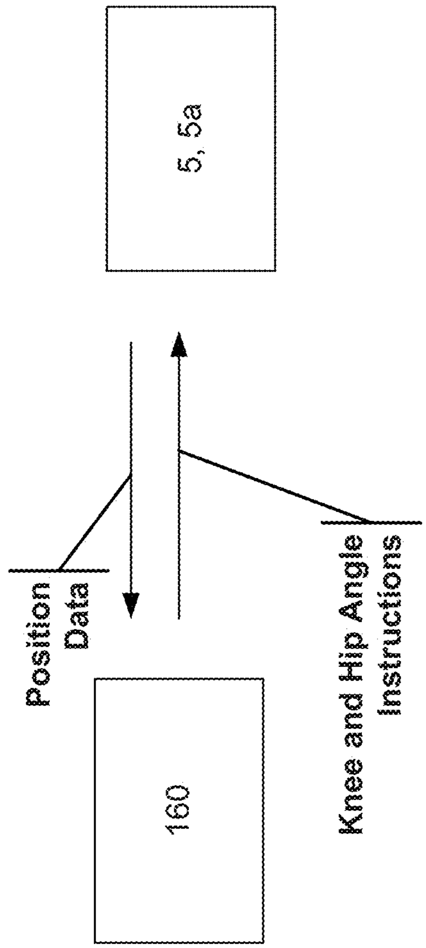
FIG. 19 is a diagram of the remote controller and the articulating dummy.

The articulating pedestrian dummy described above may be used as part of a larger system that may include a moving platform on which the dummy may be mounted. This platform, referred to as a DME in the inventors' previous patent applications cited above, may be controlled by a remote controller 160 (FIG. 19). The remote controller 160 may also send instructions to create the realistic gait of the articulating dummy. Presented in FIG. 18 is a screenshot of a dummy control console that includes the following user defined inputs: leg length, stride length, thigh length, maximum knee articulation (swing phase), loading phase knee articulation, shoulder articulation (sinusoidal amplitude), and stance duration. With these inputs and the equations described above, a realistic gait can be constructed by the remote controller processors, and appropriate instructions sent to the dummy for implementation.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus it is to be understood that the description and drawings presented herein represent a presently-preferred embodiment of the invention and are therefore representative of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

The invention claimed is:

1. A method for creating a realistic human gait for an articulating dummy with a leg comprising an articulating hip joint and an articulating knee joint and a set of servos, wherein the gait comprises a gait cycle with a stance phase and a swing phase, the method comprising:

a) defining respective durations of the stance phase and the swing phase;

b) determining a position of the articulating dummy within the gait cycle;

c) calculating a knee angle based on: (1) the position of the articulating dummy determined in-step (b), and (2) whether the position is in the stance phase or the swing phase;

d) calculating a hip angle based on: (1) the knee angle calculated in step (c), (2) the position of the articulating dummy determined in step (b), and (3) whether the position is in the stance phase or the swing phase to satisfy a non-slip longitudinal tracking constraint of the leg relative to the ground during the stance phase;

e) transmitting the calculated knee angle and the calculated hip angle to the articulating dummy; and f) actuating the set of servos to rotate the articulating hip joint and the articulating knee joint based on the transmitted calculated knee angle and calculated hip angle.

2. The method of claim 1, wherein the calculation in step (c) is approximated by a haversine function.

3. The method of claim 2, wherein the haversine function is variable based on the position of the articulating dummy within the gait cycle.

4. The method of claim 1, wherein the calculation in step (c) is approximated by two variable-period haversine functions.

5. The method of claim 1, wherein the calculation in step (d) is approximated by a cosine function when in the stance phase.

6. The method of claim 1, wherein the stance phase is not equal in time to the swing phase.

7. The method of claim 1, further comprising:

g) repeating steps (b) through (d) for discrete positions within the gait cycle; and h) storing the knee angle and the hip angle calculated for each iteration of step (g) in a look-up table.

8. The method of claim 7, wherein the gait cycle has a range of 0% to 100% and the discrete positions of step (g) are separated by an interval of at most 5% of the gait cycle.

9. The method of claim 7, wherein the gait cycle has a range of 0% to 100% and the discrete positions of step (g) are separated by an interval of at most 1% of the gait cycle.

10. A method for creating a realistic human gait using the look-up table of claim 7, the method comprising:

a) determining a first set of knee and hip angles for a desired position within the gait cycle based on the look-up table;

b) determining a second set of knee and hip angles for a position that is 180 degrees out of phase with the desired position in step (a) based on the look-up table;

c) transmitting the first set and the second set to the articulating dummy, wherein the articulating dummy further comprises a second leg comprising a second articulating hip joint and a second articulating knee joint;

d) actuating the first leg based on the first set; and e) actuating the second leg based on the second set.

11. A system for creating a realistic human gait, wherein the gait comprises a gait cycle with a stance phase and a swing phase, the system comprising:

a remote controller comprising:

a wireless transmitter connected to a processor;

the processor configured to:

a) receive an input for respective durations of the stance phase and the swing phase;

b) determine a position of an articulating dummy within the gait cycle;

c) calculate a knee angle based on: (1) the determined position of step (b), and (2) whether the determined position is in the stance phase or the swing phase;

d) calculate a hip angle based on: (1) the calculated knee angle of step (c), (2) the determined position of step (b), and (3) whether the determined position is in the stance phase or the swing phase to satisfy a non-slip longitudinal tracking constraint of the leg relative to the ground during the stance phase; and e) transmit the calculated knee and hip angles to the articulating dummy;

the articulating dummy comprising:

a leg comprising an articulating hip joint connected to an upper leg, an articulating knee joint connecting the upper leg to a lower leg, and a set of servos;

a wireless receiver; and a servo controller connected to the set of servos and to the wireless receiver, the servo controller constructed to:

1) Receive the knee and hip angles from the remote controller; and

2) Actuate the set of servos based on the received knee and hip angles.

12. The system of claim 11, wherein the processor is configured to receive an input of stride length, wherein the calculation of the hip angle is based on a length of the upper leg and the stride length.

13. The system of claim 11, wherein the processor is configured to receive an input of a length of the upper leg and a length of the lower leg, wherein the calculation of the hip angle is based on the length of the upper leg and the length of the lower leg.

14. The system of claim 11, wherein the calculation of the knee angle is approximated by a haversine function.

15. The system of claim 11, wherein the haversine function is variable based on the position of the articulating dummy within the gait cycle.

16. The system of claim 11, wherein the calculation of the knee angle is approximated by two variable-period haversine functions.

17. The system of claim 11, wherein the calculation of the hip angle is approximated by a cosine function when in the stance phase.

18. The system of claim 11, wherein the input of the stance phase is not equal in time to the swing phase.

* * * * *